(12) United States Patent
Dejneka et al.

(10) Patent No.: US 11,053,159 B2
(45) Date of Patent: Jul. 6, 2021

(54) POLYCHROMATIC ARTICLES AND METHODS OF MAKING THE SAME

(71) Applicant: Corning Incorporated, Corning, NY (US)

(72) Inventors: Matthew John Dejneka, Corning, NY (US); Jesse Kohl, Horseheads, NY (US); Stephan Lvovich Logunov, Corning, NY (US); Galan Gregory Moore, West Henrietta, NY (US)

(73) Assignee: Corning Incorporated, Corning, NY (US)

( * ) Notice: Subject to any disclaimer, the term of this patent is extended or adjusted under 35 U.S.C. 154(b) by 345 days.

(21) Appl. No.: 16/190,712

(22) Filed: Nov. 14, 2018

(65) Prior Publication Data
US 2019/0177206 A1  Jun. 13, 2019

Related U.S. Application Data

(60) Provisional application No. 62/598,194, filed on Dec. 13, 2017.

(51) Int. Cl.
| | | |
|---|---|---|
| *C03C 3/091* | (2006.01) | |
| *C03C 14/00* | (2006.01) | |
| *C03C 4/02* | (2006.01) | |
| *C03C 10/00* | (2006.01) | |

(52) U.S. Cl.
CPC .............. *C03C 3/091* (2013.01); *C03C 4/02* (2013.01); *C03C 10/0045* (2013.01); *C03C 10/0054* (2013.01); *C03C 14/006* (2013.01); *C03C 2201/10* (2013.01); *C03C 2201/32* (2013.01); *C03C 2201/40* (2013.01); *C03C 2214/08* (2013.01); *C03C 2214/16* (2013.01)

(58) Field of Classification Search
CPC .. C03C 3/091; C03C 4/02; C03C 4/06; C03C 4/065; C03C 10/0045; C03C 10/0054; C03C 14/006
See application file for complete search history.

(56) References Cited

U.S. PATENT DOCUMENTS

| | | |
|---|---|---|
| 457,106 A | 8/1891 | Boynton |
| 3,788,865 A | 1/1974 | Babock et al. |
| 4,075,024 A | 2/1978 | Armistead |
| 4,240,836 A | 12/1980 | Borrelli et al. |
| 9,403,716 B2 | 8/2016 | Dejneka |
| 2009/0062102 A1 | 3/2009 | Borrelli et al. |
| 2014/0256865 A1 | 9/2014 | Boulton et al. |
| 2017/0362119 A1 | 12/2017 | Dejneka et al. |

FOREIGN PATENT DOCUMENTS

| | | |
|---|---|---|
| CN | 1210124 A | 3/1999 |
| EP | 2581353 A1 | 4/2013 |
| WO | 2017054779 A1 | 4/2017 |
| WO | 2017180811 A1 | 10/2017 |
| WO | 2017218859 A1 | 12/2017 |

OTHER PUBLICATIONS

Adachi et al, "Chromatic Instabilities in Cesium-Doped Tungsten Bronze Nanoparticles", J. Appl. Phys., 115 194304 (2013).
Chen et al; "Preparation and Near-Infrared Photothermal Conversion Property of Cesium Tungsten Oxide Nanoparticles", Nanoscale Res. Lett., 8, 57 (2013).
Dejneka et al; "Articles Including Glass and/or Glass-Ceramics and Methods of Making the Same" Filed as 15840040 on Dec. 13, 2017; 42 Pages.
Dejneka et al; "Devices With Bleached Discrete Region and Methods of Manufacture" Filed as PCT/US2018/050258 on Sep. 10, 2018 59.
Dejneka et al; "Glass-Ceramics and Glass-Ceramic Articles With UV- and NIR-Blocking Characteristics"; Filed as PCT/US2018/063792 on Dec. 4, 2018; 65 Pages.
Dejneka et al; "Glass-Ceramics and Glasses"; Filed as U.S. Appl. No. 16/171,939 on Oct. 26, 2018; 106 Pages.
Dejneka et al; "Glass-Ceramics and Methods of Making the Same" Filed as U.S. Appl. No. 16/190,297 on Nov. 14, 2018; 62 Pages.
Dickens et al; "The Tungsten Bronzes and Related Compounds", J. Amer. Chem. Soc., 81, 5556 (1981).
El-Sayed et al; "Some Properties of Sodium Tungsten Bronzes as a Function of Sodium Concentration", Indian Journal of Chem. Tech., 12, 204 (2005).
Green et al, "Optical Properties of Lithium Tungsten Bronze Thin Films", J. Appl. Phys. 81, 3592 (1997).
Green et al; "Optical Properties of Dilute Hydrogen Tungsten Bronze Thin Films", J. Appl. Phys. 74, 3451 (1993).
Hussain, "Optical and Electrochromic Properties of Annealed Lithium-Molybdenum-Bronze Thin Films", J. Electronics Materials, vol. 31 [6], 2002.
K.A. Kaliyev, "What Are Tungsten Bronzes", EIR vol. 20, No. 17, Apr. 30, 1993.
Kim et al; "Near Infrared Cut-Off Characteristics of Various Perovskite-Based Composite Films", IPCBEE 43, 9 (2012).
Kohl, "Amber/Purple Glass—A Molecular Approach", The Flow Magazine, Sep. 2007.
Moon et al; "Near Infrared Shielding Properties of Quarternary Tungsten Bronze Nanoparticles Na0.11Cs0.22WO3", Bull. Korean Chem. Soc. 34 [3], 731 (2013).

(Continued)

*Primary Examiner* — Elizabeth A. Bolden
(74) *Attorney, Agent, or Firm* — Kevin L. Bray

(57) ABSTRACT

An article includes $SiO_2$ from about 40 mol % to about 80 mol %, $Al_2O_3$ from about 1 mol % to about 20 mol %, $B_2O_3$ from about 3 mol % to about 50 mol %, $WO_3$ plus $MoO_3$ from about 1 mol % to about 18 mol % and at least one of: (i) Au from about 0.001 mol % to about 0.5 mol %, (ii) Ag from about 0.025 mol % to about 1.5 mol %, and (iii) Cu from about 0.03 mol % to about 1 mol %, and $R_2O$ from about 0 mol % to about 15 mol %. The $R_2O$ is one or more of $Li_2O$, $Na_2O$, $K_2O$, $Rb_2O$ and $Cs_2O$. $R_2O$ minus $Al_2O_3$ ranges from about −12 mol % to about 3.8 mol %.

23 Claims, 7 Drawing Sheets

(56) References Cited

OTHER PUBLICATIONS

Rouhani, "Photochromism of Molybdenum Oxide"; National University of Singapore, PhD Thesis, NUS Graduate School for Integrative Sciences and Engineering, 2013.
Shi et al; "Hydrothermal Synthesis of CSxWO3 and the Effects of N2 Annealing on Its Microstructure and Heat Shielding Properties", J. Mater. Sci. Technol., 30 [4], 342 (2014).
Stookey et al; "Full-Color Photosensitive Glass", J. Appl. Phys., 49, 5114-5123 (1978).
Stookey; "Coloration of Glass by Gold, Silver, and Copper"; J. Am. Ceram. Soc., 32[8], 246-249 (1949).
W. A. Weyl, "Coloured Glasses", Society of Glass Technology, 1951.
Zeng et al; "The Preparation of a High Perfomance Near-Infrared Shielding CSxWO3/Si02 Composite Resin Coating and Research on Its Optical Stability Under Ultraviolet Illumination"; Journal of Materials Chemistry C; 2015, 3, pp. 8050-8060.
International Search Report and Written Opinion PCT/US2018/064997 dated Mar. 13, 2019.
Cameo Glass; Britannica Online Encyclopedia; 2 Pages; 2018.
Masterpix(TM) Fine Glass Prints; Corning Incorporated; 2019; 3 Pages.

POLYCHROMATIC ARTICLES AND METHODS OF MAKING THE SAME

This application claims the benefit of priority to U.S. Provisional Application Ser. No. 62/598,194 filed on Dec. 13, 2017, the content of which is relied upon and incorporated herein by reference in its entirety.

FIELD OF THE DISCLOSURE

The present disclosure generally relates to polychromatic articles, and more specifically, to compositions and methods of forming polychromatic glass and glass-ceramic articles.

BACKGROUND

Colored and/or reflective glass articles are used in a variety of applications. Low production volumes coupled with the down time and un-sellable glass that is produced when a glass tank is transitioned from one color to another makes offering a range of colors of the articles economically challenging. For example, with an increasing number of colors offered, either separate production lines or more un-sellable glass must be produced.

The development of polychromatic glass materials is challenging as there are a select group of gold-, silver-, and copper-containing glasses that have modulatable optical transmittance; all either fail to achieve required transmittance or to produce a sufficiently broad range of colors from a single composition for sunglasses, filters, or colored glasses. In addition they contain volatile halides which makes them difficult to reproduce. Most conventional silver and copper containing glasses can be thermally darkened, but do not produce a wide range of colors. Gold can produce a range of colors including reds to purples, to blues, but only over a limited range of optical densities for a single composition. Coloration typically achieved with conventional gold-, silver- and copper-containing glasses is a combination of a surface plasmon resonance and scattering due to the large particle size (on the order of 100 nm). This scattering is undesirable for optical lens material. Other conventional methods of producing colored or reflective articles (e.g., through the application of metallic films and/or coatings) exhibit poor abrasion resistance, excessive reflection, iridescence, variability in color as a function of viewing angle, and poor ion exchangeability.

As such, the development of a single material composition that can be processed after fabrication (e.g., by thermal treatment) to produce a range of colors while permitting a desired level of transmittance may be advantageous. Not only would a "single composition" approach yield performance benefits, it would also significantly lower the cost of colored and/or reflective article production.

SUMMARY OF THE DISCLOSURE

According to at least one feature of the present disclosure, an article includes $SiO_2$ from about 40 mol % to about 80 mol %, $Al_2O_3$ from about 1 mol % to about 20 mol %, $B_2O_3$ from about 3 mol % to about 50 mol %, $WO_3$ plus $MoO_3$ from about 1 mol % to about 18 mol % and at least one of: (i) Au from about 0.001 mol % to about 0.5 mol %, (ii) Ag from about 0.025 mol % to about 1.5 mol %, and (iii) Cu from about 0.03 mol % to about 1 mol %, and $R_2O$ from about 0 mol % to about 15 mol %. The $R_2O$ is one or more of $Li_2O$, $Na_2O$, $K_2O$, $Rb_2O$ and $Cs_2O$. $R_2O$ minus $Al_2O_3$ ranges from about −12 mol % to about 3.8 mol %.

According to another feature of the present disclosure, an article includes $SiO_2$ from about 60 mol % to about 72 mol %, $Al_2O_3$ from about 7 mol % to about 12 mol %, $B_2O_3$ from about 8 mol % to about 15 mol %, $WO_3$ plus $MoO_3$ from about 3 mol % to about 6 mol %, RO from about 0 mol % to about 0.5 mol %. RO is one or more of MgO, CaO, SrO, BaO. The article further includes at least one of: (i) Au from about 0.001 mol % to about 0.5 mol %, (ii) Ag from about 0.025 mol % to about 1.5 mol %, and (iii) Cu from about 0.03 mol % to about 1 mol % and $R_2O$ from about 7 mol % to about 12 mol %. $R_2O$ is one or more of $Li_2O$, $Na_2O$, $K_2O$, $Rb_2O$ and $Cs_2O$. $R_2O$ minus $Al_2O_3$ ranges from about −6 mol % to about 1.5 mol %.

According to another feature of the present disclosure, an article includes $SiO_2$ from about 40 mol % to about 80 mol %, $Al_2O_3$ from about 1 mol % to about 20 mol %, $B_2O_3$ from about 3 mol % to about 50 mol %, $WO_3$ plus $MoO_3$ from about 1 mol % to about 18 mol % and at least one of: (i) Au from about 0.001 mol % to about 0.5 mol %, (ii) Ag from about 0.025 mol % to about 1.5 mol %, and (iii) Cu from about 0.03 mol % to about 1 mol %. The article further includes a plurality of crystalline precipitates including (i) at least one of Au, Ag and Cu and (ii) at least one of W and Mo According to a first aspect, an article is provided that includes $SiO_2$ from about 40 mol % to about 80 mol %, $Al_2O_3$ from about 1 mol % to about 20 mol %, $B_2O_3$ from about 3 mol % to about 50 mol %, $WO_3$ plus $MoO_3$ from about 1 mol % to about 18 mol % and at least one of: (i) Au from about 0.001 mol % to about 0.5 mol %, (ii) Ag from about 0.025 mol % to about 1.5 mol %, and (iii) Cu from about 0.03 mol % to about 1 mol %, and $R_2O$ from about 0 mol % to about 15 mol %. The $R_2O$ is one or more of $Li_2O$, $Na_2O$, $K_2O$, $Rb_2O$ and $Cs_2O$. $R_2O$ minus $Al_2O_3$ ranges from about −12 mol % to about 3.8 mol %.

According to a second aspect, the article of aspect 1 is provided, wherein the article comprises $WO_3$ from about 0 mol % to about 15 mol %.

According to a third aspect, the article of aspect 2 is provided, wherein the $WO_3$ is from about 0 mol % to about 7 mol %.

According to a fourth aspect, the article of aspect 1 is provided, wherein the article comprises $MoO_3$ from about 0 mol % to about 15 mol %.

According to a fifth aspect, the article of aspect 1 is provided, wherein the $MoO_3$ is from about 0 mol % to about 7 mol %.

According to a sixth aspect, the article of aspect 1 is provided, wherein the $Al_2O_3$ is from about 7 mol % to about 15 mol %.

According to a seventh aspect, the article of aspect 1 further comprises RO from about 0 mol % to about 2 mol %, wherein the RO is one or more of MgO, CaO, SrO and BaO.

According to an eighth aspect, the article of aspect 7 is provided, wherein the RO is from about 0 mol % to about 1 mol %.

According to a ninth aspect, the article of aspect 1 is provided, wherein the $R_2O$ minus $Al_2O_3$ ranges from about −8 mol % to about 3.8 mol %.

According to a tenth aspect, the article of aspect 1 is provided, wherein the $R_2O$ minus $Al_2O_3$ ranges from about −8 mol % to about 3 mol %.

According to an eleventh aspect, the article of aspect 1 is provided, wherein the Ag is from about 0.1 mol % to about 1 mol %.

According to a twelfth aspect, the article of aspect 1 is provided, wherein the Au is from about 0.001 mol % to about 0.5 mol %.

According to a thirteenth aspect, the article of aspect 1 is provided, wherein the Cu is from about 0.03 mol % to about 1 mol %.

According to a fourteenth aspect, an article is provided that includes $SiO_2$ from about 60 mol % to about 72 mol %, $Al_2O_3$ from about 7 mol % to about 12 mol %, $B_2O_3$ from about 8 mol % to about 15 mol %, $WO_3$ plus $MoO_3$ from about 3 mol % to about 6 mol %, RO from about 0 mol % to about 0.5 mol %. RO is one or more of MgO, CaO, SrO, BaO. The article further includes at least one of: (i) Au from about 0.001 mol % to about 0.5 mol %, (ii) Ag from about 0.025 mol % to about 1.5 mol %, and (iii) Cu from about 0.03 mol % to about 1 mol % and $R_2O$ from about 7 mol % to about 12 mol %. $R_2O$ is one or more of $Li_2O$, $Na_2O$, $K_2O$, $Rb_2O$ and $Cs_2O$. $R_2O$ minus $Al_2O_3$ ranges from about −6 mol % to about 1.5 mol %.

According to a fifteenth aspect, the article of aspect 14 further comprises at least one dopant selected from the group consisting of Ti, V, Cr, Mn, Fe, Co, Ni, Se, Nb, Mo, Tc, Ru, Rh, Pd, Cd, Te, Ta, Re, Os, Ir, Pt, Tl, Pb, Bi, Ce, Pr, Nd, Sm, Eu, Gd, Tb, Dy, Ho, Er, Tm, Yb, and Lu.

According to a sixteenth aspect, the article of aspect 14 is provided, wherein the $WO_3$ is from about 0 mol % to about 4 mol %.

According to a seventeenth aspect, the article of aspect 14 is provided, wherein the $MoO_3$ is from about 0 mol % to about 4 mol %.

According to an eighteenth aspect, the article of aspect 14 is provided, wherein the article comprises a plurality of crystalline precipitates comprising at least one of $WO_3$ and $MoO_3$.

According to a nineteenth aspect, the article of aspect 14 further comprises $V_2O_5$ from about 0.0001 mol % to about 0.5 mol %.

According to twentieth aspect, the article of aspect 19 is provided, wherein the $V_2O_5$ is from about 0.001 mol % to about 0.1 mol %.

According to a twenty-first aspect, the article of aspect 14 further comprises, a compressive stress region.

According to a twenty-second aspect, an article is provided that includes $SiO_2$ from about 40 mol % to about 80 mol %, $Al_2O_3$ from about 1 mol % to about 20 mol %, $B_2O_3$ from about 3 mol % to about 50 mol %, $WO_3$ plus $MoO_3$ from about 1 mol % to about 18 mol % and at least one of: (i) Au from about 0.001 mol % to about 0.5 mol %, (ii) Ag from about 0.025 mol % to about 1.5 mol %, and (iii) Cu from about 0.03 mol % to about 1 mol %. The article further includes a plurality of crystalline precipitates including (i) at least one of Au, Ag and Cu and (ii) at least one of W and Mo.

According to a twenty-third aspect, the article of aspect 22 is provided, wherein the article exhibits a set of transmitted color coordinates having: an L* value of from about 14 to about 90, an a* value from about −18.6 to about 49 and a b* value from about −7.8 to about 53.5 at a thickness of about 0.5 mm under D65-10 illumination.

According to a twenty-fourth aspect, the article of aspect 22 is provided, wherein the article exhibits an average transmittance of from about 0.01% to about 49% over a wavelength band of from about 280 nm to about 380 nm at a 0.5 mm thickness.

According to a twenty-fifth aspect, the article of aspect 22 is provided, wherein the article exhibits an average transmittance of from about 0.8% to about 86% over a wavelength band of from about 400 nm to about 700 nm at a 0.5 mm thickness.

According to a twenty-sixth aspect, the article of aspect 25 is provided, wherein the article exhibits a scattering of about 25% or less over a wavelength band of about 400 nm to about 700 nm at a thickness of 1 mm.

According to a twenty-seventh aspect, the article of aspect 22 is provided, wherein the article exhibits an average transmittance of from about 0.13% to about 88.7% over a wavelength band of from about 700 nm to about 2000 nm at a 0.5 mm thickness.

According to a twenty-eighth aspect, the article of aspect 22 further comprises a plurality of metallic Ag particles proximate a surface of the article.

According to a twenty-ninth aspect, the article of aspect 22 further comprises RO from about 0.01 mol % to about 2 mol %, wherein the RO is one or more of MgO, CaO, SrO, BaO.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Figure 1:
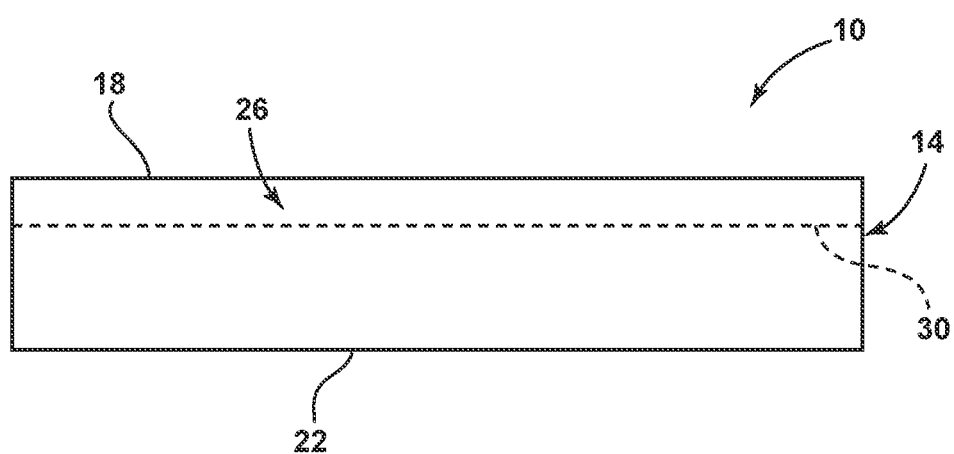
FIG. 1 is a cross-sectional view of an article, according to at least one example of the disclosure.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

For purposes of this disclosure, the terms "bulk," "bulk composition" and/or "overall compositions" are intended to include the overall composition of the entire article, which may be differentiated from a "local composition" or "localized composition" which may differ from the bulk composition owing to the formation of crystalline and/or ceramic phases.

As also used herein, the terms "article," "glass-article," "ceramic-article," "glass-ceramics," "glass elements," "glass-ceramic article" and "glass-ceramic articles" may be used interchangeably, and in their broadest sense, to include any object made wholly or partly of glass and/or glass-ceramic material.

As used herein, a "glass state" refers to an inorganic amorphous phase material within the articles of the disclosure that is a product of melting that has cooled to a rigid condition without crystallizing. As used herein, a "glass-ceramic state" refers to an inorganic material within the articles of the disclosure which includes both the glass state and a "crystalline phase" and/or "crystalline precipitates" as described herein.

As used herein, "transmission", "transmittance", "optical transmittance" and "total transmittance" are used interchangeably in the disclosure and refer to external transmission or transmittance, which takes absorption, scattering and reflection into consideration. Fresnel reflection is not subtracted out of the transmission and transmittance values reported herein. In addition, any total transmittance values referenced over a particular wavelength range are given as an average of the total transmittance values measured over the specified wavelength range.

As used herein, "optical density units", "OD" and "OD units" are used interchangeably in the disclosure to refer to optical density units, as commonly understood as a measure of absorbance of the material tested, as measured with a spectrometer given by $OD=-\log(I/I_0)$ where $I_0$ is the intensity of light incident on the sample and I is the intensity of light that is transmitted through the sample. Further, the terms "OD/mm" or "OD/cm" used in this disclosure are normalized measures of absorbance, as determined by dividing the optical density units (i.e., as measured by an optical spectrometer) by the thickness of the sample (e.g., in units of millimeters or centimeters). In addition, any optical density units referenced over a particular wavelength range (e.g., 3.3 OD/mm to 24.0 OD/mm in UV wavelengths from 280 nm to 380 nm) are given as an average value of the optical density units over the specified wavelength range.

Referring now to FIG. 1, an article 10 is depicted that includes a substrate 14 having a glass and/or glass-ceramic composition according to the disclosure. The article 10 can be employed in any number of applications. For example, the article 10 and/or substrate 14 can be employed in the form of substrates, elements, covers and other elements in any number of optics related and/or aesthetic applications.

The substrate 14 defines or includes a pair of opposing primary surfaces 18, 22. In some examples of the article 10, the substrate 14 includes a compressive stress region 26. As shown in FIG. 1, the compressive stress region 26 extends from the primary surface 18 to a first selected depth 30 in the substrate. In some examples, the substrate 14 includes a comparable compressive stress region 26 that extends from the primary surface 18 to a second selected depth. Further, in some examples, multiple compressive stress regions 26 may extend from the primary surfaces 18, 22 and/or edges of the substrate 14. The substrate 14 may have a selected length and width, or diameter, to define its surface area. The substrate 14 may have at least one edge between the primary surfaces 18, 22 of the substrate 14 defined by its length and width, or diameter. The substrate 14 may also have a selected thickness.

As used herein, a "selected depth," (e.g., selected depth 30) "depth of compression" and "DOC" are used interchangeably to define the depth at which the stress in the substrate 14, as described herein, changes from compressive to tensile. DOC may be measured by a surface stress meter, such as an FSM-6000, or a scattered light polariscope (SCALP) depending on the ion exchange treatment. Where the stress in a substrate 14 having a glass or a glass-ceramic composition is generated by exchanging potassium ions into the glass substrate, a surface stress meter is used to measure DOC. Where the stress is generated by exchanging sodium ions into the glass article, SCALP is used to measure DOC. Where the stress in the substrate 14 having a glass or glass-ceramic composition is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by a surface stress meter. As also used herein, the "maximum compressive stress" is defined as the maximum compressive stress within the compressive stress region 26 in the substrate 14. In some examples, the maximum compressive stress is obtained at or in close proximity to the one or more primary surfaces 18, 22 defining the compressive stress region 26. In other examples, the maximum compressive stress is obtained between the one or more primary surfaces 18, 22 and the selected depth 30 of the compressive stress region 26.

In some examples of the article 10, as depicted in exemplary form in FIG. 1, the substrate 14 is selected from a chemically strengthened alumino-boro-silicate glass or glass-ceramic. For example, the substrate 14 can be selected from chemically strengthened alumino-boro-silicate glass or glass-ceramic having a compressive stress region 26 extending to a first selected depth 30 of greater than 10 μm, with a maximum compressive stress of greater than 150 MPa. In further examples, the substrate 14 is selected from a chemically strengthened alumino-boro-silicate glass or glass-ceramic having a compressive stress region 26 extending to a first selected depth 30 of greater than 25 μm, with a maximum compressive stress of greater than 400 MPa. The substrate 14 of the article 10 may also include one or more compressive stress regions 26 that extend from one or more of the primary surfaces 18, 22 to a selected depth 30 (or depths) having a maximum compressive stress of greater than about 150 MPa, greater than 200 MPa, greater than 250 MPa, greater than 300 MPa, greater than 350 MPa, greater than 400 MPa, greater than 450 MPa, greater than 500 MPa, greater than 550 MPa, greater than 600 MPa, greater than 650 MPa, greater than 700 MPa, greater than 750 MPa, greater than 800 MPa, greater than 850 MPa, greater than 900 MPa, greater than 950 MPa, greater than 1000 MPa, and all maximum compressive stress levels between these values. In some examples, the maximum compressive stress is 2000 MPa or lower. In addition, the depth of compression (DOC) or first selected depth 30 can be set at 10 μm or greater, 15 μm or greater, 20 μm or greater, 25 μm or greater, 30 μm or greater, 35 μm or greater, and to even higher depths, depending on the thickness of the substrate 10 and the processing conditions associated with generating the compressive stress region 26. In some examples, the DOC is less than or equal to 0.3 times the thickness (t) of the substrate 14, for example 0.3 t, 0.28 t, 0.26 t, 0.25 t, 0.24 t, 0.23 t, 0.22 t, 0.21 t, 0.20 t, 0.19 t, 0.18 t, 0.15 t, or 0.10 t and all values there between.

As will be explained in greater detail below, the article 10 is formed from an as-batched composition and is cast in a glass state. The article 10 may later be annealed and/or thermally processed (e.g., heat treated) to form a glass-ceramic state having a plurality of ceramic or crystalline particles. It will be understood that depending on the casting technique employed, the article 10 may readily crystallize and become a glass-ceramic without additional heat treatment (e.g., essentially be cast into the glass-ceramic state). In examples where a post-forming thermal processing is employed, a portion, a majority, substantially all or all of the article 10 may be converted from the glass state to the glass-ceramic state. As such, although compositions of the article 10 may be described in connection with the glass state and/or the glass-ceramic state, the bulk composition of the article 10 may remain substantially unaltered when converted between the glass and glass-ceramic states, despite localized portions of the article 10 having a different composition (i.e., owing to the formation of the ceramic or crystalline precipitates). Further, it will be understood that while the compositions are described in terms of an as-batched state, one having ordinary skill in the art will recognize which constituents of the article 10 may volatize in the melting process (i.e., and therefore be less present in the article 10 relative to the as-batched composition) and others which will not.

According to various examples, the article 10 may include $Al_2O_3$, $SiO_2$, $B_2O_3$, $WO_3$, $MO_3$, Ag, Au, Cu, $V_2O_5$, $R_2O$ where $R_2O$ is one or more of $Li_2O$, $Na_2O$, $K_2O$, $Rb_2O$ and $Cs_2O$, RO where RO is one or more of MgO, CaO, SrO, BaO and ZnO and a number of dopants. Unless otherwise noted, glass compositions correspond to as-batched mole percentage (mol %) in a crucible for melting.

The article 10 may have from about 40 mol % to about 80 mol % $SiO_2$, or from about 50 mol % to about 75 mol % $SiO_2$ or from about 60 mol % to about 72 mol % $SiO_2$. For example, the article 10 may have about 42 mol %, about 44 mol %, about 46 mol %, about 48 mol %, about 50 mol %, about 52 mol %, about 54 mol %, about 56 mol %, about 58 mol %, about 60 mol %, about 62 mol %, about 64 mol %, about 66 mol %, about 68 mol %, about 70 mol %, about 72 mol %, about 74 mol %, about 76 mol % or about 78 mol % $SiO_2$. It will be understood that any and all values and ranges between the above noted ranges of $SiO_2$ are contemplated.

The article 10 may include from about 1 mol % to about 20 mol % $Al_2O_3$, or from about 7 mol % to about 20 mol % $Al_2O_3$, or from about 1 mol % to about 15 mol % $Al_2O_3$, or from about 5 mol % to about 15 mol % $Al_2O_3$, or from about 7 mol % to about 15 mol % $Al_2O_3$, or from about 7 mol % to about 12 mol % $Al_2O_3$. For example, the article 10 may have about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol % or about 14 mol % $Al_2O_3$. It will be understood that any and all values and ranges between the above noted ranges of $Al_2O_3$ are contemplated.

The article 10 may include $WO_3$ and/or $MoO_3$. The combined amount of $WO_3$ and $MoO_3$ is referred to herein as "$WO_3$ plus $MoO_3$" where it is understood that "$WO_3$ plus $MoO_3$," refers to $WO_3$ alone, $MoO_3$ alone, or a combination of $WO_3$ and $MoO_3$. For example, $WO_3$ plus $MoO_3$ may be from about 1 mol % to about 18 mol %, or from about 2 mol % to about 10 mol %, or from about 3.5 mol % to about 8 mol % or from about 3 mol to about 6 mol %. With respect to $MoO_3$, the article 10 may have from about 0 mol % to about 15 mol % $MoO_3$, or from about 0 mol % to about 7 mol % $MoO_3$, or from about 0 mol % to about 4 mol % $MoO_3$. For example, the article may have about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol % $MoO_3$. With respect to WO$_3$, the article 10 may have from about 0 mol % to about 15 mol % WO$_3$, or from about 0 mol % to about 7 mol % WO$_3$, or from about 0 mol % to about 4 mol % WO$_3$. For example, the article may have about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol %, about 14 mol % WO$_3$. It will be understood that any and all values and ranges between the above noted ranges of WO$_3$ plus MoO$_3$, WO$_3$ and/or MoO$_3$ are contemplated.

The article 10 may include from about 3 mol % to about 50 mol % B$_2$O$_3$, or from about 5 mol % to about 50 mol % of B$_2$O$_3$, or from about 5 mol % to about 25 mol % B$_2$O$_3$, or from about 8 mol % to about 15 mol % B$_2$O$_3$. It will be understood that any and all values and ranges between the above noted ranges of B$_2$O$_3$ are contemplated.

The article 10 may include at least one alkali metal oxide. The alkali metal oxide may be represented by the chemical formula R$_2$O where R$_2$O is one or more of Li$_2$O, Na$_2$O, K$_2$O, Rb$_2$O, Cs$_2$O and/or combinations thereof. The article 10 may have R$_2$O from about 0 mol % to about 15 mol %, or from about 3 mol % to about 14 mol % or from about 7 mol % to about 12 mol % R$_2$O. For example, the article 10 may have about 1 mol %, about 2 mol %, about 3 mol %, about 4 mol %, about 5 mol %, about 6 mol %, about 7 mol %, about 8 mol %, about 9 mol %, about 10 mol %, about 11 mol %, about 12 mol %, about 13 mol % or about 14 mol % R$_2$O. It will be understood that any and all values and ranges between the above noted ranges of R$_2$O are contemplated.

According to various examples, R$_2$O minus Al$_2$O$_3$ (i.e., the difference between the amount of R$_2$O and Al$_2$O$_3$) ranges from about from about −12 mol % to about 4 mol %, or from about −12 mol % to about 3.8 mol %, or from about −10 mol % to about 3.5 mol %, or from about −8 mol % to about 3 mol %, or from about −6 mol % to about 1.5 mol %. It will be understood that any and all values and ranges between the above noted ranges of R$_2$O minus Al$_2$O$_3$ are contemplated. The difference in R$_2$O and Al$_2$O$_3$ specified herein influences the availability of excess alkali cations to interact with tungsten oxide, thereby modulating/controlling the formation of alkali tungsten bronzes (e.g. non-stoichiometric tungsten sub-oxides) or stoichiometric alkali tungstates (e.g., Na$_2$WO$_4$).

The article 10 may include at least one alkaline earth metal oxide and/or ZnO. The alkaline earth metal oxide may be represented by the chemical formula RO where RO is one or more of MgO, CaO, SrO, and BaO. The article 10 may include RO from about 0 mol % to about 15 mol % RO, or from about 3 mol % to about 14 mol % RO, or from about 0.01 mol % to about 2 mol % RO, or from about 0 mol % to about 0.5 mol % RO. The article 10 may include ZnO from about 0 mol % to about 15 mol % ZnO, or from about 3 mol % to about 14 mol % ZnO, or from about 0 mol % to about 0.5 mol % ZnO. It will be understood that any and all values and ranges between the above noted ranges of RO and ZnO are contemplated. According to various examples, the amount of R$_2$O may be greater than the amount of RO and/or ZnO. Further, the article 10 may be free of RO and/or ZnO.

The article 10 may include from about 0 mol % to about 0.5 mol % of SnO$_2$, or from about 0.05 mol % to about 2 mol % of SnO$_2$. The article 10 may include from about 0.01 mol % to about 1.5 mol % Cu, or from about 0.05 mol % to about 1.0 mol % Cu or from about 0.1 mol % to about 0.5 mol % Cu. The article 10 may include from about 0.0001 mol % V$_2$O$_5$, or from about 0.0005 mol % to about 0.5 mol % V$_2$O$_5$, or from about 0.001 mol % to about 0.1 mol % V$_2$O$_5$ or from about 0.001 mol % to about 0.005 V$_2$O$_5$. The article 10 may include from about 0.05 mol % to about 1.5 mol % Ag, or from about 0.1 mol % to about 1.0 mol % Ag or from about 0.25 mol % to about 0.6 mol % Ag. It will be understood that any and all values and ranges between the above noted ranges of SnO$_2$, Cu, V$_2$O$_5$ or Ag are contemplated. For example, the article 10 may include at least one of: (i) Au from about 0.001 mol % to about 0.5 mol %, (ii) Ag from about 0.025 mol % to about 1.5 mol %, and (iii) Cu from about 0.03 mol % to about 1.0 mol %. It will be understood that Ag, Au and/or Cu may exist within the article 10 at any oxidation state and/or in a combination of oxidation states in the above noted mol % values.

According to various examples, the article 10 can further include at least one dopant selected from the group consisting of Ti, V, Cr, Mn, Fe, Co, Ni, Se, Nb, Mo, Tc, Ru, Rh, Pd, Cd, Te, Ta, Re, Os, Ir, Pt, Tl, Pb, Bi, Ce, Pr, Nd, Sm, Eu, Gd, Tb, Dy, Ho, Er, Tm, Yb, and/or Lu to alter the ultraviolet, visual, color and/or near-infrared absorbance. The dopants may have concentration of from about 0.0001 mol % to about 1.0 mol % within the glass composition. In some examples, Ag, Au and/or Cu may be dopants.

It will be understood that each of the above noted compositions and composition ranges for SiO$_2$, Al$_2$O$_3$, WO$_3$, MoO$_3$, WO$_3$ plus MoO$_3$, B$_2$O$_3$, R$_2$O, RO, V$_2$O$_5$, Ag, Au, Cu, SnO$_2$, and dopants may be used with any other composition and/or composition range of the other constituents of the glass as outlined herein. For example, Tables 1, 2 and 3 provide exemplary composition ranges of the article 10 in an as-batched mol %.

TABLE 1

| Constituent | Min. | Max. |
| --- | --- | --- |
| SiO$_2$ | 40 | 80 |
| Al$_2$O$_3$ | 1 | 15 |
| B$_2$O$_3$ | 5 | 50 |
| R$_2$O | 0 | 15 |
| RO | 0 | 2 |
| ZnO | 0 | 2 |
| P$_2$O$_5$ | 0 | 3 |
| MoO$_3$ | 0 | 15 |
| WO$_3$ | 1 | 15 |
| SnO$_2$ | 0 | 0.5 |
| Ag | 0 | 1.5 |
| Au | 0 | 0.5 |
| Cu | 0 | 1 |
| CeO$_2$ | 0 | 1 |
| MoO$_3$ plus WO$_3$ | 1.25 | 18 |
| R$_2$O minus Al$_2$O$_3$ | −12 | 5 |

TABLE 2

| Constituent | Min. | Max. |
| --- | --- | --- |
| SiO$_2$ | 50 | 75 |
| Al$_2$O$_3$ | 5 | 15 |
| B$_2$O$_3$ | 5 | 25 |
| R$_2$O | 3 | 14 |
| RO | 0 | 1 |
| ZnO | 0 | 1 |
| P$_2$O$_5$ | 0 | 2 |
| MoO$_3$ | 0 | 7 |
| WO$_3$ | 0 | 7 |
| SnO$_2$ | 0 | 0.5 |
| Ag | 0 | 1 |
| Au | 0 | 0.5 |
| Cu | 0 | 1 |

TABLE 2-continued

| Constituent | Min. | Max. |
|---|---|---|
| $CeO_2$ | 0.0005 | 0.5 |
| $MoO_3$ plus $WO_3$ | 1 | 8 |
| $R_2O$ minus $Al_2O_3$ | −8 | 3.5 |

TABLE 3

| Constituent | Min. | Max. |
|---|---|---|
| $SiO_2$ | 60 | 72 |
| $Al_2O_3$ | 7 | 12 |
| $B_2O_3$ | 8 | 15 |
| $R_2O$ | 7 | 12 |
| RO | 0 | 0.5 |
| ZnO | 0 | 0.5 |
| $P_2O_5$ | 0 | 1.5 |
| $MoO_3$ | 0 | 4 |
| $WO_3$ | 0 | 4 |
| $SnO_2$ | 0 | 0.5 |
| Ag | 0 | 0.5 |
| Au | 0 | 0.5 |
| Cu | 0 | 1 |
| $CeO_2$ | 0.001 | 0.005 |
| $MoO_3$ plus $WO_3$ | 1 | 6 |
| $R_2O$ minus $Al_2O_3$ | 0 | 0.15 |

Table 4 provides a list of exemplary properties of the article 10 in an un-doped state (e.g., where Cu, Ag, Au and V are considered dopants and no other dopants are included). The data of Table 4 corresponds to the article 10 having the composition outlined in as example 31 below.

TABLE 4

| Property | Value |
|---|---|
| Strain Point | 455° C. |
| Anneal Point | 499.6° C. |
| Softening Point | 723.2° C. |
| Expansion m × $10^{-7}$/° C. | 60.3 |
| Density g/cm$^3$ at 4° C. | 2.509 |
| Liquidus Temperature | 970° C. |

Table 5 provides exemplary viscosity values at standard points for of the article 10 in an un-doped state (e.g., where Cu, Ag, Au and V are considered dopants and no other dopants are included). The data of Table 5 corresponds to the article 10 having the composition outlined in as example 31 below.

TABLE 5

| Temperature (° C.) | Viscosity (Poise) |
|---|---|
| 974.8 | 125833 |
| 1011.8 | 67629 |
| 1049.3 | 37407 |
| 1087.1 | 21447 |
| 1129.4 | 11992 |
| 1165.9 | 7493 |
| 1203.3 | 4741 |
| 1240.8 | 3054 |
| 1278.9 | 2007 |
| 1317.5 | 1323 |
| 1356.8 | 886 |
| 1416.5 | 524 |
| 1457.6 | 357 |
| 1499.8 | 246 |
| 1527.7 | 200 |

As explained above, conventional formation of tungsten-, molybdenum-, or mixed tungsten molybdenum-containing alkali glasses has been hampered by the separation of the melt constituents during the melting process. The separation of the glass constituents during the melting process resulted in a perceived solubility limit of alkali tungstate within the molten glass, and therefore of articles cast from such melts. Conventionally, when a tungsten, molybdenum, or mixed tungsten-molybdenum melt was even slightly peralkaline (e.g., $R_2O$ minus $Al_2O_3$=about 0.25 mol % or greater), the melted borosilicate glass formed both a glass and a dense liquid second phase. While the concentration of the alkali tungstate second phase could be minimized by thorough mixing, melting at a high temperature, and employing a small batch size (~1000 g), it could not be fully eliminated leading to formation of a deleterious second crystalline phase. It is believed that the formation of this alkali tungstate phase occurs in the initial stages of the melt, where tungsten and/or molybdenum oxide reacts with "free" or "unbound" alkali carbonates. Due to the high density of alkali tungstate and/or alkali molybdate relative to the borosilicate glass that is formed, it rapidly segregates and/or stratifies, pooling at the bottom of the crucible and does not rapidly solubilize in the glass due to the significant difference in density. As the $R_2O$ constituents may provide beneficial properties to the glass composition, simply decreasing the presence of the $R_2O$ constituents within the melt may not be desirable. As the tungsten segregates, it is difficult to saturate the glass with it, and accordingly, it is difficult to get it to crystallize from the glass and form the precipitates as described herein.

It has been discovered by the inventors of the present disclosure that a homogenous single-phase W or Mo-containing peralkaline melt may be obtained through the use of "bound" alkalis. For purposes of this disclosure, "bound" alkalis are alkali elements which are bonded to oxygen ions which are bound to aluminum, boron, and/or silicon atoms, while "free" or "unbound" alkalis are alkali carbonates, nitrates, or sulfates, which are not bound to an oxygen ion already bound to silicon, boron, or aluminum, atoms. Exemplary bound alkalis may include feldspar, nepheline, borax, spodumene, other sodium or potassium feldspars, alkali-aluminum-silicates and/or other oxide compositions containing an alkali and one or more aluminum and/or silicon atoms. By introducing the alkali in the bound form, the alkalis may not react with the W or Mo present in the melt to form the dense alkali tungstate and/or alkali molybdate liquid. Moreover, this change in batch material may allow the melting of strongly peralkaline compositions (e.g., $R_2O$—$Al_2O_3$=about 2.0 mol % or more) without the formation of an alkali tungstate and/or alkali molybdate second phase. This has also allowed the melt temperature and mixing method to be varied and still produce a single-phase homogenous glass. It will be understood that as the alkali tungstate phase and the borosilicate glass are not completely immiscible, prolonged stirring may also allow mixing of the two phases to cast a single phase article.

Once the glass melt is cast and solidified into the glass state article, the article 10 may be annealed, heat treated or otherwise thermally processed to form or modify a crystalline phase within the article 10. Accordingly, the article 10 may be transformed from the glass state to the glass-ceramic state. The crystalline phase of the glass-ceramic state may take a variety of morphologies. According to various examples, the crystalline phase is formed as a plurality of precipitates within the heat treated region of the article 10. As such, the precipitates may have a generally crystalline structure. The glass-ceramic state may include two or more crystalline phases.

As used herein, "a crystalline phase" refers to an inorganic material within the articles of the disclosure that is a solid composed of atoms, ions or molecules arranged in a pattern that is periodic in three dimensions. Further, "a crystalline phase" as referenced in this disclosure, unless expressly noted otherwise, is determined to be present using the following method. First, powder x-ray diffraction ("XRD") is employed to detect the presence of crystalline precipitates. Second, Raman spectroscopy ("Raman") is employed to detect the presence of crystalline precipitates in the event that XRD is unsuccessful (e.g., due to size, quantity and/or chemistry of the precipitates). Optionally, transmission electron microscopy ("TEM") is employed to visually confirm or otherwise substantiate the determination of crystalline precipitates obtained through the XRD and/or Raman techniques. In certain circumstances, the quantity and/or size of the precipitates may be low enough that visual confirmation of the precipitates proves particularly difficult. As such, the larger sample size of XRD and Raman may be advantageous in sampling a greater quantity of material to determine the presence of the precipitates.

The crystalline precipitates may have a generally rod-like or needle-like morphology. The precipitates may have a longest length dimension of from about 1 nm to about 500 nm, or from about 1 nm to about 400 nm, or from about 1 nm to about 300 nm, or from about 1 nm to about 250 nm, or from about 1 nm to about 200 nm, or from about 1 nm to about 100 nm, or from about 1 nm to about 75 nm, or from about 1 nm to about 50 nm, or from about 5 nm to about 50 nm, or from about 1 nm to about 25 nm, or from about 1 nm to about 20 nm, or from about 1 nm to about 10 nm. The size of the precipitates may be measured using Electron Microscopy. For purposes of this disclosure, the term "Electron Microscopy" means visually measuring the longest length of the precipitates first by using a scanning electron microscope, and if unable to resolve the precipitates, next using a transmission electron microscope. As the crystalline precipitates may generally have a rod-like or needle-like morphology, the precipitates may have a width of from about 5 nm to about 50 nm, or from about 2 nm to about 30 nm, or from about 2 nm to about 10 nm, or from about 2 nm to about 7 nm. It will be understood that the size and/or morphology of the precipitates may be uniform, substantially uniform or may vary. Generally, peraluminous compositions of the article 10 may produce precipitates having a needle-like shape with a length of from about 100 nm to about 250 nm and a width of from about 5 nm to about 30 nm. Peraluminous compositions are compositions that have a molecular proportion of aluminum oxide higher than the combination of sodium oxide, potassium oxide and calcium oxide. Peralkaline compositions of the article 10 may produce needle-like precipitates having a length of from about 10 nm to about 30 nm and a width of from about 2 nm to about 7 nm. Ag, Au and/or Cu containing examples of the article 10 may produce rod-like precipitates having a length of from about 2 nm to about 20 nm and a width, or diameter, of from about 2 nm to about 10 nm. A volume fraction of the crystalline phase in the article 10 may range from about 0.001% to about 20%, or from about 0.001% to about 15%, or from about 0.001% to about 10%, or from about 0.001% to about 5%, or from about 0.001% to about 1%.

The relatively small size of the precipitates may be advantageous in reducing the amount of light scattered by the precipitates leading to high optical clarity of the article 10 when in the glass-ceramic state. As will be explained in greater detail below, the size and/or quantity of the precipitates may be varied across the article 10 such that different portions of the article 10 may have different optical properties. For example, portions of the article 10 where the precipitates are present may lead to changes in the absorbance, color, reflectance and/or transmission of light, as well as the refractive index as compared to portions of the article 10 where different precipitates (e.g., size and/or quantity) and/or no precipitates are present.

The precipitates may be composed of tungsten oxide and/or molybdenum oxide. The crystalline phase includes an oxide, from about 0.1 mol % to about 100 mol % of the crystalline phase, of at least one of: (i) W, (ii) Mo, (iii) V and an alkali metal cation, and (iv) Ti and an alkali metal cation. Without being bound by theory, it is believed that during thermal processing (e.g., heat treating) of the article 10, tungsten and/or molybdenum cations agglomerate to form crystalline precipitates thereby transforming the glass state into the glass-ceramic state. The molybdenum and/or tungsten present in the precipitates may be reduced, or partially reduced. For example, the molybdenum and/or tungsten within the precipitates may have an oxidation state of between 0 and about +6, or from about +4 and about +6, or from about +5 and about +6. According to various examples, the molybdenum and/or tungsten may have a +6 oxidation state. For example, the precipitates may have the general chemical structure of $WO_3$ and/or $MoO_3$. The precipitates may be known as non-stoichiometric tungsten suboxides, non-stoichiometric molybdenum suboxides, "molybdenum bronzes" and/or "tungsten bronzes." One or more of the above-noted alkali metals and/or dopants may be present within the precipitates. Tungsten and/or molybdenum bronzes are a group of non-stoichiometric tungsten and/or molybdenum sub-oxides that takes the general chemical form of $M_xWO_3$ or $M_xMoO_3$, where M=H, Li, Na, K, Rb, Cs, Ca, Sr, Ba, Zn, Ag, Au, Cu, Sn, Cd, In, Tl, Pb, Bi, Th, La, Pr, Nd, Sm, Eu, Gd, Dy, Ho, Er, Tm, Yb, Lu, and U, and where $0<x<1$. The structures $M_xWO_3$ and $M_xMoO_3$ are considered to be a solid state defect structure in which holes (vacancies and/or interstices) in a reduced $WO_3$ or $MoO_3$ network are randomly occupied by M atoms, which are dissociated into $M^+$ cations and free electrons. Depending on the concentration of "M," the material properties can range from metallic to semi-conducting, thereby allowing a variety of optical absorption and electronic properties to be tuned.

A portion, a majority, substantially all or all of the article 10 may be thermally processed to form the precipitates. Thermal processing techniques may include, but are not limited to, a furnace (e.g., a heat treating furnace), a laser and/or other techniques of locally and/or bulk heating of the article 10. While undergoing thermal processing, the crystalline precipitates internally nucleate within the article 10 in a homogenous manner where the article 10 is thermally processed to form the glass-ceramic state. As such, in some examples, the article 10 may include both glass and glass-ceramic portions. In examples where the article 10 is thermally processed in bulk (e.g., the whole article 10 is placed in a furnace), the precipitates may homogenously form throughout the article 10. In other words, the precipitates may exist from a surface of the article 10 throughout the bulk of the article 10 (i.e., greater than about 10 μm from the surface). In examples where the article 10 is thermally processed locally (e.g., via a laser), the precipitates may only be present where the thermal processing reaches a sufficient temperature (e.g., at the surface and into the bulk of the article 10 proximate the heat source). It will be understood that the article 10 may undergo more than one thermal processing to produce the precipitates. Additionally or alternatively, thermal processing may be utilized to remove and/or alter precipitates which have already been formed (e.g., as a result of previous thermal processing). For example, thermal processing may result in the decomposition of precipitates.

According to various examples, the article 10 may be polychromatic. For purposes of this disclosure, the term "polychromatic" means a material which is capable of exhibiting different colors based on thermal treatments applied to it. $WO_3$ has no absorption of NIR and visible wavelengths due to its wide band gap (e.g., about 2.62 eV) and lack of free carriers (e.g., electrons). With the insertion (termed 'intercalation') of dopant ions (e.g., $NH_4^+$, $Li^+$, $Na^+$, $K^+$, $Rb^+$, $Cs^+$, etc.), part of tungsten atoms in $WO_3$ are reduced from $W^{+6}$ to $W^{+5}$, resulting in free electrons within the crystal. These electrons occupy conduction bands (e.g., free electrons) and localized states in band gaps (e.g., trapped electrons). As a result, the doped $WO_3$ (tungsten bronzes) acquires the ability of blocking NIR Over a wide wavelength range (e.g., $\lambda > 1100$ nm) by absorbing NIR whose photon energy is lower than 0.7 eV through localized surface plasmon resonance and insulating NIR whose photon energy is near 1.4 eV through a small polaron mechanism. It will be understood that the same manner of doping and its effects are present in compositions including $MoO_3$ as well as compositions with both $WO_3$ and $MoO_3$.

Conventional glass compositions which utilize Ag, Au and/or Cu rely on the formation of nanoscale metallic precipitates to generate colors. Ag, Au and/or Cu cations can intercalate into $WO_3$ and $MoO_3$ forming silver, gold and/or copper tungsten bronzes and/or silver, gold and/or copper molybdenum bronzes which may allow the article 10 exhibit polychromatic optical properties. Surprisingly, with the addition of a small concentration of Ag, Au and/or Cu to $M_xWO_3$ and/or $M_xMoO_3$ containing articles 10, a variety of colors (e.g., red, orange, yellow, green, blue, various browns and/or combinations thereof) could be produced by thermally processing the material at different times and temperatures. This result was quite unexpected because post-formation optical testing of the resultant articles 10 did not show evidence that the colors produced were simply summations of the optical absorption from the alkali tungsten and/or molybdenum bronzes phase (e.g., blue or green color) and absorbance characteristic of spherical metallic nanoparticles (e.g., metallic $Ag^0$). Further analysis demonstrated that the color tunability was not due to the formation of ensembles of metallic nanoparticles that template atop a crystalline phase (e.g., $M_xWO_3$ or $M_xMoO_3$). For example, transmission electron microscopy revealed that the total volume fraction of the tungsten and/or molybdenum-containing crystalline phase, the crystallite size, shape, and aspect ratio remained constant irrespective of the color. Similarly, Raman spectroscopy detected tungsten and/or molybdenum bronze phases, but not the presence of metallic nanoparticles of any shape or size. As such, the resultant color and polychromatic nature of the article 10 does not manifest from some change in the tungsten and/or molybdenum-containing crystallite precipitate size.

In view of the above discussion, it is believed that the origin of color tunability in these polychromatic articles 10 is due to the change in the band gap energy of the doped tungsten and/or molybdenum oxide precipitates, arising from the concentration of intercalated of alkali cations as well as Ag, Au and/or Cu cations into the precipitates to form a pure alkali, mixed alkali-metal, and/or a pure metal tungsten and/or molybdenum bronzes of varying stoichiometry. Changes in the band gap energy of the precipitates are due to its stoichiometry and in-turn is largely independent of crystallite size. Therefore doped $M_xWO_3$ or $M_xMoO_3$ precipitates can remain the same size and/or shape, yet could provide the article 10 with many different colors depending on the dopant "M" identity and concentration "x". Further, it is believed that the thermal processing time and temperature control the stoichiometry "x" and possibly the identity of "M." For example, at relatively low temperatures, blue and green colors were observed that are characteristic of a $M_xWO_3$ and/or $M_xMoO_3$ bronze, where M=an alkali and $0.1<x<0.4$. At temperatures above where these 'blue bronzes' form, colors such as yellow, red, and orange are formed, that suggest that "x" in $M_xWO_3$ is $>0.4$ and approaches 1 with increasing heat treatment time.

As such, the polychromatic nature, or color tunability, is a function of "M" in $M_xWO_3$ and $M_xMoO_3$ when M is something else other than sodium (i.e., M Na), or M is a combination of species: H, Li, Na, K, Rb, Cs, Mg, Ca, Sr, Sn, P, S, Ti, V, Cr, Mn, Fe, Co, Ni, Cu, Ga, Se, Zr, Nb, Ru, Rh, Pd, Ag, Cd, In, Sb, Te, La, Ce, Pr, Nd, Sm, Eu, Gd, Tb, Dy, Ho, Er, Tm, Yb, Lu, Ta, Os, Ir, Pt, Au, Tl, Pb, Bi, and/or U. The resultant color is due to the total dopant concentration x and also the identities of M (i.e., species with different electron densities, but the same charge can produce different optical responses). As will be understood, some of the species listed can only intercalate up to some x value (i.e., a narrower range of x than $0 \leq x \leq 1$). This may be due to the cation size and charge. For example, red, yellow and/or orange colors can be obtained from non-stoichiometric tungstate compounds containing divalent cations M' where M' is one of MgO, CaO, SrO, BaO, ZnO, of the form $M'_{2-x}WO_4$ (where $0<x<1$).

The thermal processing of the article 10 to develop the precipitates and/or generate color may be accomplished in a single step or through multiple steps. For example, the generation of colors exhibited by the article 10 (e.g., which starts with the formation of a $WO_3$ and/or $MoO_3$ precipitates followed by the partial reduction of that crystallite with the simultaneous intercalation of a dopant species (e.g., an Ag, Au and/or Cu cation into the crystal)) can be completed in a single heat treatment after immediately after the article 10 is formed, or at a later point. For example, the article 10 may be cast and then processed into a final form (e.g., lens blanks or other optical or aesthetic elements) and then annealed at a temperature just below where color is generated (e.g., intercalation of the Ag, Au and/or Cu ions into the precipitates). This annealing may start the clustering of $WO_3$ and/or $MoO_3$, and then a secondary thermal processing may occur at an elevated temperature to allow further crystallization and the partial reduction of the $WO_3$ and/or $MoO_3$ crystals and intercalation of Ag, Au, Cu, and/or other species to generate color.

The thermal processing of the article 10, which generates the precipitates and/or intercalates the dopants into the precipitates, may occur under a variety of times and temperatures. It will be understood that thermal processing of the article 10 is carried out in air unless otherwise noted. In examples where the article 10 is thermally processed in a furnace, the article 10 may be placed in the furnace at room temperature with a controlled ramping in temperature and/or may be "plunged" into a furnace already at an elevated temperature. The thermal processing may occur at a temperature of from about 400° C. to about 1000° C. For example, the second thermal processing may take place at a temperature of about 400° C., or about 425° C., or about 450° C., or about 475° C., or about 500° C., or about 505° C., or about 510° C., or about 515° C., or about 520° C., or about 525° C., or about 530° C., or about 535° C., or about 540° C., or about 545° C., or about 550° C., or about 555° C., or about 560° C., or about 565° C., or about 570° C., or about 575° C., or about 580° C., or about 585° C., or about 590° C., or about 595° C., or about or about 600° C., or about 605° C., or about 610° C., or about 615° C., or about 620° C., or about 625° C., or about 630° C., or about 635° C., or about 640° C., or about 645° C., or about 650° C., or about 655° C., or about 660° C., or about 665° C., or about 670° C., or about 675° C., or about 680° C., or about 685° C., or about 690° C., or about 695° C., or about 700° C.

The thermal processing may be carried out for a time period of from about 1 second to about 24 hours. For example, the thermal processing may be carried out for about 1 second, or about 30 seconds, or about 45 seconds, or about 1 minute, or about 2 minutes, or about 5 minutes, or about 10 minutes, or about 15 minutes, or about 20 minutes, or about 25 minutes, or about 30 minutes, or about 35 minutes, or about 40 minutes, or about 45 minutes, or about 50 minutes, or about 55 minutes, or about 60 minutes, or about 65 minutes, or about 70 minutes, or about 75 minutes, or about 80 minutes, or about 85 minutes, or about 90 minutes, or about 95 minutes, or about 100 minutes, or about 105 minutes, or about 110 minutes, or about 115 minutes, or about 120 minutes, or about 125 minutes, or about 130 minutes, or about 135 minutes, or about 140 minutes, or about 145 minutes, or about 150 minutes, or about 155 minutes, or about 160 minutes, or about 165 minutes, or about 170 minutes, or about 175 minutes, or about 180 minutes, or about 185 minutes, or about 190 minutes, or about 195 minutes, or about 200 minutes, about 205 minutes, or about 210 minutes or about 215 minutes, or about 220 minutes, or about 225 minutes, or about 230 minutes, or about 235 minutes, or about 240 minutes, or about 245 minutes, or about 250 minutes, or about 255 minutes or about 300 minutes. It will be understood that thermal processing may be carried out for significantly longer times upwards of about 6 hours or more, 7 hours or more, 8 hours or more, 9 hours or more, 10 hours or more, 11 hours or more, 12 hours or more, 13 hours or more, 14 hours or more or 15 hours or more.

In some examples, the article 10 may then be cooled to a lower temperature at a rate of about 0.1° C. per minute, or about 1° C. per minute, or about 2° C. per minute, or about 3° C. per minute, or about 4° C. per minute, or about 5° C. per minute, or about 6° C. per minute, or about 7° C. per minute, or about 8° C. per minute, or about 9° C. per minute or about 10° C. per minute. The lower temperature may be from about room temperature (e.g., 23° C.) to about 500° C. For example, the lower temperature may be about 23° C., about 50° C., about 75° C., about 100° C., about 125° C., about 150° C., about 175° C., about 200° C., about 225° C., about 250° C., about 275° C., about 300° C., about 325° C., about 350° C., about 375° C., about 400° C., or about 425° C., or about 450° C., or about 470° C. or about 500° C. It will be understood that the article 10 may undergo a multistage thermal processing using one or more of the above noted time and temperatures.

It will be understood that any and all values and ranges for time and temperature between the values provided for the thermal processing are contemplated. Further, it will be understood that any combination of the above noted times and temperatures are contemplated.

As explained above, additionally or alternatively to the use of a furnace, the article 10 may be thermally processed through the use of laser and/or other localized heat source. Such an example may be advantageous in producing a localized color or polychromatic effect. The laser and/or localized heat source may supply sufficient thermal energy to create the precipitates and/or intercalate one or more of Ag, Au and/or Cu into the precipitates to generate localized color. The laser and/or other heat source may be rastered or guided across the article 10 to preferentially create color and/or varied optical properties across the article 10. The intensity and/or speed of the laser and/or localized heat source may be adjusted as it is moved across the article 10 such that various portions of the article 10 exhibit different colors. Such features may be advantageous in creating indicia, symbols, text, numbers and/or pictures in the article 10.

As explained above, depending on the composition of the article 10 and the thermal processing it undergoes, the article 10 may exhibit a variety of colors. Specifically, the article 10 may exhibit the following colors: blue, green, brown, amber, yellow, orange, red, oxblood red, shades of neutral gray and bronze-brown colors and/or combinations thereof. It will be understood that any of these colors and/or color combinations may be generated in bulk across the article 10 and/or in localized portions of the article 10 as explained above. The color of the article may be expressed in terms of a three-dimensional L*a*b* color space where L* *is lightness and a* and b* for the color opponents green-red and blue-yellow, respectively. Additionally or alternatively, the color of the article 10 may also be expressed in values of X and Y where Y is luminance and X is a mix (e.g., a linear combination) of cone response curves chosen to be non-negative. Unless otherwise specified the L*, a*, b* and X, Y color coordinates, with specular component included, are collected under D65-10 illumination with an X-Rite colorimeter in transmittance mode on polished 0.5 mm thick flats cut from rolled sheet after heat treatment. In other words, the color coordinates are transmitted color coordinates. The article 10 may exhibit an L* value of from about 6 to about 90, or from about 6 to about 85, or from about 4 to about 86, or from about 14 to about 90, or from about 21 to about 88, or from about 4.5 to about 81, or from about 39 to about 90, or from about 8 to about 90, or from about 15 to about 91, or from about 28 to about 92, or from about 16 to about 81, or from about 49 to about 89, or from about 41 to about 96 or from about 15.6 to about 96. The article 10 may exhibit an a* value from about −18.6 to about 49, or from about −13 to about 41, or from about −9 to about 38, or from about −14 to about 31, or from about −11 to about 36, or from about −12 to about 29 or from about −12 to about 26. The article 10 may exhibit a b* value of from about −7.8 to about 53.5, or from about −2 to about 63, or from about 2 to about 70, or from about 6 to about 70, or from about 1 to about 68, or from about 1 to about 65, or from about 4 to about 49, or from about 1 to about 37, or from about 4 to about 24 or from about 5 to about 30. The article 10 may exhibit an X value of from about 0.24 to about 0.65, or from about 0.31 to about 0.66, or from about 0.27 to about 0.62, or from about 0.29 to about 0.66, or from about 0.30 to about 0.65, or from about 0.29 to about 0.60, or from about 0.31 to about 0.57 or from about 0.3 to about 0.48. The article 10 may exhibit a Y value of from about 0.32 to about 0.43, or from about 0.34 to about 0.40, or from about 0.33 to about 0.43 or from about 0.35 to about 0.38. It will be understood that all values and ranges between the above noted ranges and values are contemplated for L*, a*, b*, X and Y. Further, it will be understood that any of the L*, a*, b*, X and Y values may be used in conjunction with any of the other L*, a*, b*, X and Y values.

The article 10 may exhibit an absorbance over certain wavelength bands of electromagnetic radiation. The absorbance may be expressed in terms of optical density per millimeter (OD/mm). As understood by those in the art, optical density is the log of the ratio of light intensity exiting the article 10 to light intensity entering the article 10. Absorbance data may be collected using a UV/Vis spectrophotometer in conformance with the measurement rules according to ISO 15368. Over a wavelength range of from about 280 nm to about 380 nm, the article 10 may have an absorbance of 0.6 OD/mm to greater than about 8 OD/mm, or from about 1 OD/mm to about greater than 8 OD/mm or from about 4 OD/mm to about greater than 8 OD/mm. For example, the article 10 may have an absorbance over a wavelength of from about 280 nm to about 380 nm of about 0.5 OD/mm or greater, or about 1.0 OD/mm or greater, or about 1.5 OD/mm or greater, or about 2.0 OD/mm or greater, or about 2.5 OD/mm or greater, or about 3.0 OD/mm or greater, or about 3.5 OD/mm or greater, or about 4.0 OD/mm or greater, or about 4.5 OD/mm or greater, or about 5.0 OD/mm or greater, or about 5.5 OD/mm or greater, or about 6.0 OD/mm or greater, or about 6.5 OD/mm or greater, or about 7.0 OD/mm or greater, or about 7.5 OD/mm or greater, or about 8.0 OD/mm or greater, or about 8.5 OD/mm or greater, or about 9.0 OD/mm or greater, or about 9.5 OD/mm or greater or about 10.0 OD/mm or greater. It will be understood that any and all values and ranges between the values listed above are contemplated.

Over a wavelength range of from about 380 nm to about 400 nm, the article 10 may have an absorbance of about 0.2 OD/mm to greater than about 8 OD/mm, or from about 1.2 OD/mm to about greater than 8 OD/mm, or from about 1.8 OD/mm to about 7.5 OD/mm. For example, the article 10 may have an absorbance over a wavelength of from about 380 nm to about 400 nm of about 0.5 OD/mm or greater, or about 1.0 OD/mm or greater, or about 1.5 OD/mm or greater, or about 2.0 OD/mm or greater, or about 2.5 OD/mm or greater, or about 3.0 OD/mm or greater, or about 3.5 OD/mm or greater, or about 4.0 OD/mm or greater, or about 4.5 OD/mm or greater, or about 5.0 OD/mm or greater, or about 5.5 OD/mm or greater, or about 6.0 OD/mm or greater, or about 6.5 OD/mm or greater, or about 7.0 OD/mm or greater, or about 7.5 OD/mm or greater, or about 8.0 OD/mm or greater, or about 8.5 OD/mm or greater, or about 9.0 OD/mm or greater, or about 9.5 OD/mm or greater or about 10.0 OD/mm or greater. It will be understood that any and all values and ranges between the values listed above are contemplated.

Over a wavelength range of from about 400 nm to about 700 nm, the article 10 may have an absorbance of 0.1 OD/mm to about 6 OD/mm, or from about 0.1 OD/mm to about 4.4 OD/mm, or from about 0.6 OD/mm to about 4.2 OD/mm. For example, the article 10 may have an absorbance over a wavelength of from about 400 nm to about 700 nm of about 0.5 OD/mm, or about 1.0 OD/mm, or about 1.5 OD/mm, or about 2.0 OD/mm, or about 2.5 OD/mm, or about 3.0 OD/mm, or about 3.5 OD/mm, or about 4.0 OD/mm, or about 4.5 OD/mm, or about 5.0 OD/mm, or about 5.5 OD/mm or about 6.0 OD/mm. It will be understood that any and all values and ranges between the values listed above are contemplated.

Over a wavelength range of from about 700 nm to about 2000 nm, the article 10 may have an absorbance of 0.1 OD/mm to about 5.7 OD/mm, or from about 0.1 OD/mm to about 5.8 OD/mm or from about 0.1 OD/mm to about 5.2 OD/mm. For example, over a wavelength range of from about 700 nm to about 2000 nm, the article 10 may have an absorbance of about 0.2 OD/mm, or about 0.4 OD/mm, or about 0.6 OD/mm, or about 0.8 OD/mm, or about 1.0 OD/mm, or about 1.2 OD/mm, or about 1.4 OD/mm, or about 1.6 OD/mm, or about 1.8 OD/mm, or about 2.0 OD/mm, or about 2.2 OD/mm, or about 2.4 OD/mm, or about 2.6 OD/mm, or about 2.8 OD/mm, or about 3.0 OD/mm, or about 3.2 OD/mm, or about 3.4 OD/mm, or about 3.6 OD/mm, or about 3.8 OD/mm, or about 4.0 OD/mm, or about 4.2 OD/mm, or about 4.4 OD/mm, or about 4.6 OD/mm, or about 4.8 OD/mm, or about, or about 5.0 OD/mm, or about 5.2 OD/mm, or about 5.4 OD/mm, or about 5.6 OD/mm or about 5.8 OD/mm. It will be understood that any and all values and ranges between the values listed above are contemplated.

The article 10 may exhibit differing transmittances over different wavelength bands of electromagnetic radiation. The transmittance may be expressed in a percent transmittance. Transmittance data may be collected using a UV/Vis spectrophotometer on a sample having a 0.5 μmm thickness in conformance with the measurement rules according to ISO 15368. Over a wavelength range of from about 280 nm to about 380 nm, the article 10 may have transmittance of 0% to about 50%, or from about 0.01 to about 30%, or from about 0.01% to about 0.91%. For example, the article 10 may have a transmittance over a wavelength of from about 280 nm to about 380 nm of about 0.5%, or about 5%, or about 10%, or about 15%, or about 20%, or about 25%, or about 30%, or about 35%, or about 40% or about 45%. It will be understood that any and all values and ranges between the values listed above are contemplated.

The article 10 may have a transmittance over a wavelength range of from about 380 nm to about 400 nm of 0% to about 86%, or from about 0.8% to about 86%, or from about 0% to about 25% or from about 0.02% to about 13%. For example, the article 10 may have a transmittance over a wavelength of from about 380 nm to about 400 nm of about 1%, or about 5%, or about 10%, or about 15%, or about 20%, or about 25%, or about 30%, or about 35%, or about 40%, or about 45%, or about 50%, or about 55%, or about 60%, or about 65%, or about 70%, or about 75% or about 80%. It will be understood that any and all values and ranges between the values listed above are contemplated. Transmittance data may be collected using a UV/Vis spectrophotometer on a sample having a 0.5 mm thickness in conformance with the measurement rules according to ISO 15368.

The article 10 may have a transmittance over a wavelength range of from about 400 nm to about 700 nm of about 0% to about 95%, or from about 0% to about 88%, or from about 0% to about 82%, or from about 0% to about 70%, or from about 0% to about 60%, or from about 0% to about 50%, or from about 0% to about 40%, or from about 0% to about 30%, or from about 0% to about 20%, or from about 0% to about 10%, or from about 5% to about 50%, or from about 10% to about 70%. It will be understood that any and all values and ranges between the values listed above are contemplated. Transmittance data may be collected using a UV/Vis spectrophotometer on a sample having a 0.5 mm thickness in conformance with the measurement rules according to ISO 15368.

Over a wavelength range of from about 400 nm to about 700 nm, the article 10 may have a transmittance of about 0% to about 90%, or from about 0% to about 80%, or from about 0% to about 70%, or from about 0% to about 60%, or from about 0% to about 50%, or from about 0% to about 40%, or from about 0% to about 30%, or from about 0% to about 20% or from about 0% to about 10%. It will be understood that any and all values and ranges between the values listed above are contemplated. Transmittance data may be collected using a UV/Vis spectrophotometer on a sample having a 0.5 mm thickness in conformance with the measurement rules according to ISO 15368.

The article 10 may exhibit a scattering of from about 0.1% to about 25% over a wavelength band of about 400 nm to about 700 nm at a thickness of 1 mm. For example, the article 10 may exhibit a scattering of about 25% or less, about 24% or less, about 23% or less, about 22% or less, about 21% or less, about 20% or less, about 19% or less, about 18% or less, about 17% or less, about 16% or less, about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less or about 1% or less. Scattering data is collected in conformance with ISO 13696 (2002) Optics and Optical Instruments—Test methods for radiation scattered by optical components.

According to various examples, the article 10 may exhibit a reflective mirror-like surface. For example, one or more of primary surfaces 18 and 22 may exhibit a reflection greater than typical Fresnel reflections produced by glasses and/or glass-ceramics. In such examples, the article 10 may undergo a reflection treatment to produce a plurality of metallic particles proximate one of the surfaces 18, 22. It will be understood that the reflection treatment may be performed at the same time as the thermal processing and/or at a different time (e.g., before and/or after the thermal processing). The article 10, in such examples, may be composed of Ag containing compositions (e.g., Ag+W, Ag+Mo+W, Ag+Au+W, or Ag+Au+Mo+W). During the reflection treatment, the article 10 may be exposed to temperatures of from about 400° C. to about 700° C., or from about 500° C. to about 600° C. For example, the article 10 may be exposed to a temperature of about 400° C., or about 425° C., or about 450° C., or about 475° C., or about 500° C., or about 525° C., or about 550° C., or about 575° C., or about 600° C., or about 625° C., or about 650° C., or about 675° C. or about 700° C. The reflection treatment may be carried out on the article 10 from about 0.5 minutes to about 360 minutes. The reflection treatment may be carried out in a reducing atmosphere such that the metallic precipitates are formed. According to various examples, the atmosphere around the article 10 during the reflection treatment may contain $H_2$. For example, the atmosphere may have a partial pressure of $H_2$ of from about 0.5%, 1.0%, 1.5%, 2.0%, or 2.5%. Additionally or alternatively, the article 10 may be exposed to a gas-oxygen flame, where the gas/oxygen ratio is adjusted such that there is not complete combustion (i.e., to form a reducing atmosphere). It will be understood that reflection treatment (e.g., being done in a controlled oxidizing or reducing atmosphere) may be utilized to further alter the bulk or surface composition of the article 10 and in-turn modify the optical absorption of the article 10.

The reflection treatment, under reducing atmospheres, causes $Ag^{1+}$ cations in the article 10 to be reduced to form metallic silver precipitates within the body of the article 10 that are sufficiently large (e.g., >50 nm) to scatter visible wavelengths of light (e.g., about 400 nm to about 700 nm). By controlling the time and temperature of the reflection treatment, Ag metal particles can be controllably precipitated proximate surfaces of the article 10. For example, the plurality of Ag metal particles may be present within the first few microns (e.g., 0.1-20 μm) of the primary surfaces 18, 22. In yet other examples, the metal particles may be distributed throughout the entire thickness of the article 10 (e.g., in examples where the article 10 is sufficiently thin). In examples where only a small fraction of the Ag cations within the first few microns of the surface of the article 10 are reduced to form metal Ag particles, the article 10 can act as a partial or broadband reflector at visible wavelengths. Thus, the reflected color of the article 10 can be changed if it only reflects certain visible wavelengths. If a sufficient quantity of metallic silver particles are formed, the article 10 may be tuned to uniformly reflect all visible wavelengths (i.e., acting as a broadband mirror). As the time at a given temperature of the reflection treatment is increased, the more numerous the Ag metal particles are and the deeper within the article 10 the Ag particles form. If the reflection treatment is conducted for sufficient time and temperature, metallic Ag particles can be precipitated throughout the entire thickness of the article 10, rendering it highly opaque.

The article 10 may have a reflectance over a wavelength band of from about 360 nm to about 760 nm prior to the reflection treatment of about 10% or less, or about 9% or less, or about 8% or less, or about 7% or less, about 6% or less, about 5% or less, about 4% or less, about 3% or less, about 2% or less or about 1% or less. Once the reflection treatment is complete, the article 10 may have an average reflectance over a wavelength band of from about 400 nm to about 700 nm of about 1% or greater, about 2% or greater, or about 3% or greater, or about 4% or greater, about 5% or greater, about 6% or greater, about 7% or greater, about 8% or greater, about 9% or greater, about 10% or greater, about 11% or greater, about 12% or greater, about 13% or greater, about 14% or greater, about 15% or greater, about 16% or greater, about 17% or greater, about 18% or greater, about 20% or greater, about 21% or greater, about 22% or greater, about 23% or greater, about 24% or greater or about 25% or greater. Reflected color measurements are collected with an X-Rite colorimeter under D65-10 illumination conditions in reflection mode.

Use of the reflection treatment may produce partially or highly reflective coatings inside of the article 10 before and/or after the formation of the precipitates through the thermal processing. In other words, the article 10 may be made reflective in either the glass or glass-ceramic states. Such a feature may be advantageous in enabling the total extinction of the article 10 to be further modified by varying the concentration of reduced metal particles and the concentration and stoichiometry of the absorptive precipitates. Formation of the metal particles may be advantageous in producing a partially or broadband reflective coating which is resistant to scratching, acids and bases because the reflective metal particles are formed within the first few microns of the surface of the article 10, and not exclusively at the material's surface like many reflective coatings that are deposited by vapor deposition or wet chemical methods.

Various examples of the present disclosure may offer a variety of properties and advantages. It will be understood that although certain properties and advantages may be disclosed in connection with certain compositions, various properties and advantages disclosed may equally be applicable to other compositions.

First, as the compositions of the article 10 disclosed herein differ from the known copper-, silver-, and gold-doped glasses, the color of the articles 10 can be widely tuned without changing composition and successfully meet optical specifications over a number of distinct colors. As such, the family of compositions disclosed herein for the article 10 may offer a practical solution to streamlining colored article production. As explained above, a wide range of optical absorbance may be achieved by varying heat treatment time and temperature after forming. As such, a single tank of glass may be used to continuously produce articles 10 that can be heat treated to multiple specific colors as customer demand dictates (i.e., reducing production down-time, decreasing unusable transition glass). Further, various compositions of the article 10 are also capable of producing a near complete rainbow of colors by varying heat treatment time and temperature across the article 10 (e.g., a rainbow of colors can be produced within a single article). In addition to changes in color, a perceived tint, or transmittance, may be varied across the article 10. As the tint of the article 10 itself may be adjusted, dyed plastic laminates, films, or dyed polycarbonate lenses of conventional articles may be eliminated. Further, as the colors, reflectance and/or tints achieved by the article are a property of the article 10 itself, the article 10 may exhibit greater environmental durability (e.g., abrasion and/or chemical resistance) than conventional articles. In specific applications, the article 10 may be utilized as sunglass lenses (i.e., which may be advantageous as the article 10 may offer a wide variety of colors in addition to absorbing infrared radiation to protect sunglass wearers from heat and the radiation) and/or in automotive or architecture applications (e.g., where gradient fades or multiple colors are desired in the same window pane providing designers a new level of flexibility with respect to multiple colors, transmission, and saturation in a monolithic article 10 all while blocking deleterious ultraviolet and/or infrared radiation thereby decreasing the heating and cooling loads on the cars or buildings they adorn). For example, the article 10 may meet the standards ISO 14 889:2013 & 8980-3 2013, ANSI Z80.3—2001, AS 1067—2003 and ISO 12312-1: 2013.

Second, as explained above, the compositions of the article 10 have a sufficiently high liquidus viscosity such that the article 10 may be capable of fusion forming. With respect to ion-exchanging, ion-exchanging may provide a compressive stress at the selected depth 30 which may increase the durability and/or scratch resistance of the article 10. With respect to fusion forming, the article 10 may be utilized in a double fusion laminate where a transparent tungsten, molybdenum, or mixed tungsten molybdenum, glass is employed as a clad material around a substrate. After application as the cladding, the glass cladding may be transformed to the glass-ceramic state. The glass-ceramic cladding of the double fusion laminates may have a thickness of from about 50 µm to about 200 µm and may have a strong UV and IR attenuation with high average visible transmittance (e.g., from about 75% to about 85% for automotive windshields and/or architectural glazing), a strong UV and IR attenuation with low visible transmittance (e.g., about 5% to about 30% for automotive side lights, automotive sunroofs, and privacy glazing) and/or a laminate where the visible and infrared absorbance can be modulated by treatment in a gradient furnace, local heating and/or localized bleaching. Additionally, use of the glass compositions as a cladding provides a novel process to fully leverage the tunable optical properties while simultaneously producing a strengthened monolithic glass ply. Further, the cladding may be applied to a substrate which also has tunable optical properties such that both the core and cladding may be independently tunable.

Third, as the articles 10 may exhibit tunable optical properties (e.g., color, transmittance, etc.) with varying thermal processing, treatment in a gradient furnace or under infrared lamp can produce nearly a complete rainbow of colors within a single piece of material (e.g., which may be desirable for aesthetic purposes such as cell phone or tablet backs). Further, as the thermal processing may be localized (e.g., through use of a laser), the article 10 may be patternable and colorable. For example, a laser-assisted heating and/or cooling process may utilize different wavelengths to produce novel decorative materials and rapidly produce logos and images within the article 10. By optimizing laser power and writing speed, a host of colors can be achieved. Further, laser patterning with multiple wavelengths may be employed to selectively bleach (i.e., remove color and/or tint in selected areas through the dissolution of the precipitates) which may be useful for decoration, gradient absorption, or other unique artistic effects.

Fourth, heating and slumping, or pressing with ceramic or metal plates engraved with text, designs, and or patterns may be used to induce a gradient in color by creating a varied thermal profile in the article 10. For example, by using a heat sink with a design or texture, a varied thermal profile upon cooling of the article 10 could produce a latent image that could be later developed by thermal processing of the article 10.

Fifth, use of a color cell on a continuous melter may be used to introduce trace dopants to the glass-composition of the article 10 as the articles 10 are produced. For example, the article 10 may be doped with $V_2O_5$ to produce greys and bronze browns and/or Ag to produce blues, greens, ambers, reds, and oranges. This would enable a full complement of colors to be produced with a fixed set of ingredients and allows rapid tank transition between Ag and $V_2O_5$-doped articles 10 without a long down time due to a difference in density. Use of the color cell may eliminate the need for a tank transition as on the fly doping of the articles 10 may produce neutral greys, bronze browns, blues, greens, ambers, reds, oranges and any combination thereof without any tank transitions (e.g., as the dopants to produce the colors may be mixed as the articles 10 are produced).

Sixth, as the articles 10 may not contain volatile halides, unlike the Armistead rainbow and Joseph full-color glasses (e.g., which make them difficult to keep on composition and in-turn reproducibly target a given color), the articles 10 may be easier and more reproducible to produce. Further, the coloration of the articles 10 may not require ultraviolet exposure and multiple heat-treatments like Joseph glass. As such, all colors can be achieved with a one-step thermal processing by optimizing time and temperature.

Seventh, articles 10 produced from the glass compositions of the present disclosure may be powdered or granulated and added to a variety of materials. For example, the powdered article 10 may be added to a paint, binder, polymeric material (e.g., polyvinyl butyral), sol-gels and/or combinations thereof. Such a feature may be advantageous in imparting one of more of the characteristics (e.g., total transmittance, UV cutoff, infrared absorbance, etc.) of the article 10 to the above mentioned material.

Eighth, the article 10 may readily form different shades of green, which is a difficult color to obtain in both the Armistead rainbow and Joseph glasses.

EXAMPLES

The following examples represent certain non-limiting examples of the glass-ceramic materials and articles of the disclosure, including the methods of making them.

Referring now to Table 6, provided is a list of exemplary compositions (Exs. 1-8) for an element (e.g., the article 10). The exemplary compositions are provided in as-batched mol %.

TABLE 6

| Constituent | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 66.848 | 67.127 | 66.859 | 66.859 | 63.049 | 62.916 | 63.861 | 63.861 |
| $Al_2O_3$ | 9.569 | 9.610 | 9.571 | 9.571 | 10.534 | 10.511 | 10.669 | 10.670 |
| $B_2O_3$ | 9.378 | 9.418 | 9.380 | 9.380 | 11.376 | 11.353 | 10.456 | 10.456 |
| $Li_2O$ | 4.822 | 4.842 | 4.822 | 4.822 | 5.307 | 5.296 | 5.642 | 5.642 |
| $Na_2O$ | 4.972 | 4.993 | 4.973 | 4.973 | 6.000 | 5.988 | 5.544 | 5.544 |
| $K_2O$ | 0.020 | 0.021 | 0.020 | 0.021 | 0.023 | 0.023 | 0.024 | 0.024 |
| CaO | 0.019 | 0.002 | 0.019 | 0.019 | 0.021 | 0.021 | 0.021 | 0.021 |
| $SnO_2$ | 0.048 | 0.048 | 0.048 | 0.048 | 0.105 | 0.210 | 0.053 | 0.053 |
| $WO_3$ | 3.828 | 3.556 | 2.871 | 1.914 | 3.476 | 3.574 | 3.628 | 3.628 |
| $MoO_3$ | 0.000 | 0.000 | 0.957 | 1.914 | 0.000 | 0.000 | 0.000 | 0.000 |
| Ag | 0.478 | 0.288 | 0.479 | 0.479 | 0.105 | 0.105 | 0.099 | 0.099 |
| Au | 0.000 | 0.000 | 0.000 | 0.000 | 0.003 | 0.003 | 0.002 | 0.001 |

Referring now to Table 7, provided is a table detailing the type of sample used for Tables 9A-11C (see description below). As the optical properties of the element are related to its thermal processing, the thermal history (i.e., whether it has been annealed or not) of the element may be relevant.

TABLE 7

| Sample Type | Description |
|---|---|
| 1 | Un-annealed quenched: glass poured from a crucible onto a steel table and rolled into a sheet with a steel roller or metal plunger. |
| 2 | Annealed Pour: glass poured from a crucible onto a steel table, transferred to an annealing oven, and annealed with cycle 0A of Table 8. |

Referring now to Table 8, provided is a listing of the heat treatment cycles (e.g., thermal processing) utilized for the Tables 9A-11C (see description below). The designation "controlled ramp" indicates that the element was loaded in a furnace at room temperature and ramped to the next provided temperature (i.e., at 10° C./min). The designation "plunged" means the element was loaded into the furnace while the furnace was at the next provided temperature. The designations of a temperature and a time indicate the temperature the element was held at and/or plunged at, and the time the element was exposed to the temperature. The designation 1 C/m followed by a temperature designates that the furnace was cooled at a rate of 1° C. per minute to the designated temperature. The designation "cooled at furnace rate" indicates the furnace was turned off and/or no longer producing heat and the element was allowed to cool at a rate that the furnace naturally lost heat. Cooling at furnace rate is approximately 5-10° C./min. The designation "cooled in air" indicates that the element was removed from the furnace at the last given temperature and allowed to cool to room temperature in air on top of a refractory element. It will be understood that where used, the designations "m" and "h" refer to time in minutes and hours, respectively. For example, cycle 6 which reads "Controlled ramp; 525 C 1.5 h; 1 C/m to 450 C; cooled at furnace rate" means that the element was placed in a furnace at room temperature, ramped to 525° C., held at 525° C. for 1.5 hours, cooled at 1° C. per minute to 450° C. and was allowed to cool within the furnace at furnace rate. Certain heat treatments include a multistep heat treatment with the steps indicated by (1) and (2).

TABLE 8

| Heat Treatment # | Description of heat Treatment Schedule |
|---|---|
| 0A | Annealing: 520 1 h 5 C./m to room temperature |
| 1 | Controlled ramp; 500 1 m; 1 C./m to 425; cooled at furnace rate |
| 2 | Controlled ramp; 500 C. 4 h; 1 C. m to 425; cooled at furnace rate |
| 4 | Controlled ramp; 525 C. 1 h; 1 C./m to 450 C.; cooled at furnace rate |
| 6 | Controlled ramp; 525 C. 1.5 h; 1 C./m to 450 C.; cooled at furnace rate |
| 7 | Controlled ramp; 525 C. 2 h; 1 C./m to 450 C.; cooled at furnace rate |
| 8 | Controlled ramp; 525 C. 4 h; 1 C./m to 450 C.; cooled at furnace rate |
| 9 | Controlled ramp; 550 C. 1 m; 1 C./m to 475 C.; cooled at furnace rate |
| 10 | Controlled ramp; 550 C. 15 m; 1 C./m to 475 C.; cooled at furnace rate |
| 12 | Controlled ramp; 550 C. 30 m; 1 C./m to 475 C.; cooled at furnace rate |
| 13 | Plunged; 550 C. 30 m; 1 C./m to 475; cooled at furnace rate |
| 14 | Controlled ramp; 550 1 h; 1 C./m to 475; cooled at furnace rate |
| 15 | Plunged; 550 1 h; 1 C./m to 475; cooled at furnace rate |
| 17 | Controlled ramp; 550 C. 2 h; 1 C./m to 475 C.; cooled at furnace rate |
| 18 | Plunged; 550 4 h; 1 C./m to 475; cooled at furnace rate |
| 19 | Plunged; 550 30 h; 1 C./m to 475; cooled at furnace rate |
| 23 | Controlled ramp; 575 C. 30 m; 1 C./m to 500 C.; cooled at furnace rate |
| 28 | Plunged; 550 C. 30 m; cooled in air |
| 29 | Plunged; 550 C. 1 h; cooled in air |
| 30 | Plunged; 575 C. 5 m; cooled in air |
| 31 | Plunged; 575 C. 10 m; cooled in air |
| 32 | Plunged; 575 C. 15 m; cooled in air |
| 34 | Plunged; 575 C. 30 m; cooled in air |
| 36 | Plunged; 575 C. 1 h; cooled in air |
| 42 | Plunged; 600 C. 5 m; cooled in air |
| 43 | Plunged; 600 C. 10 m; cooled in air |
| 44 | Plunged; 600 C. 15 m; cooled in air |

TABLE 8-continued

| Heat Treatment # | Description of heat Treatment Schedule |
|---|---|
| 46 | Plunged; 600 C. 30 m; cooled in air |
| 47 | Plunged; 600 C. 1 h; cooled in air |
| 50 | Plunged; 625 C. 5 m; cooled in air |
| 51 | Plunged; 625 C. 10 m; cooled in air |
| 52 | Plunged; 625 C. 15 m; cooled in air |
| 55 | Plunged; 625 C. 30 m; cooled in air |
| 57 | Plunged; 625 C. 1 h; cooled in air |
| 58 | Plunged; 650 C. 5 m; cooled in air |
| 59 | Plunged; 650 C. 10 m; cooled in air |
| 62 | Plunged; 650 C. 30 m; cooled in air |
| 63 | Plunged; 650 C. 1 h 20 m; cooled in air |
| 69 | Plunged; 700 C. 1 h; cooled in air |
| 70 | (1) Controlled ramp; 525 C. 1 h; 1 C./m to 450 C., unloaded at 475 C., then (2) plunged; 600 C. 5 m, cooled in air |
| 71 | (1) Controlled ramp; 525 C. 2 h; 1 C./m to 450 C.; cooled at furnace rate, then (2) plunged; 620 C. 5 m; cooled in air |
| 72 | (1) Controlled ramp; 550 C. 15 m; 1 C./m to 475 C.; cooled at furnace rate, then (2) plunged; 600 C. 5 m; cooled in air |
| 73 | (1) Controlled ramp; 550 C. 15 m; 1 C./m to 475 C.; cooled at furnace rate, then (2) plunged; 625 C. 5 m; cooled in air |
| 75 | (1) Controlled ramp; 550 C. 1.5 h; 1 C./m to 475 C.; cooled at furnace rate, then (2) plunged; 575 C. 20 m; cooled in air, then (3) plunged; 600 C. 5 m; cooled in air |
| 84 | Plunged; 525 C. 1 h; cooled in air |
| 85 | Plunged; 575 C. 1 h 26 m; cooled in air |
| 87 | Plunged; 650 C. 1 h; cooled in air |
| 88 | Controlled ramp; 500 C. 2 h; 2 C./m to 425 C.; cooled at furnace rate |
| 89 | Plunged; 525 C. 30 m; 1 C./m to 450 C.; cooled at furnace rate |
| 90 | Plunged; 525 C. 30 m; cooled in air |
| 91 | Plunged; 525 C. 5 h; cooled in air |
| 92 | Plunged; 550 C. 1 h 30 m; cooled in air |
| 93 | Controlled ramp; 500 C. 15 h; 1 C./m to 425 C.; cooled at furnace rate |
| 94 | Controlled ramp; 525 C. 15 h; 1 C./m to 450 C.; cooled at furnace rate |
| 95 | Controlled ramp; 550 C. 15 h; 1 C./m to 475 C.; cooled at furnace rate |
| 96 | 500 1 h 1 C./m to 425 C. |
| 97 | 500 8 h 1 C./m to 425 C. |
| 98 | 500 12 h 1 C./m to 425 C. |

Figure 2A:
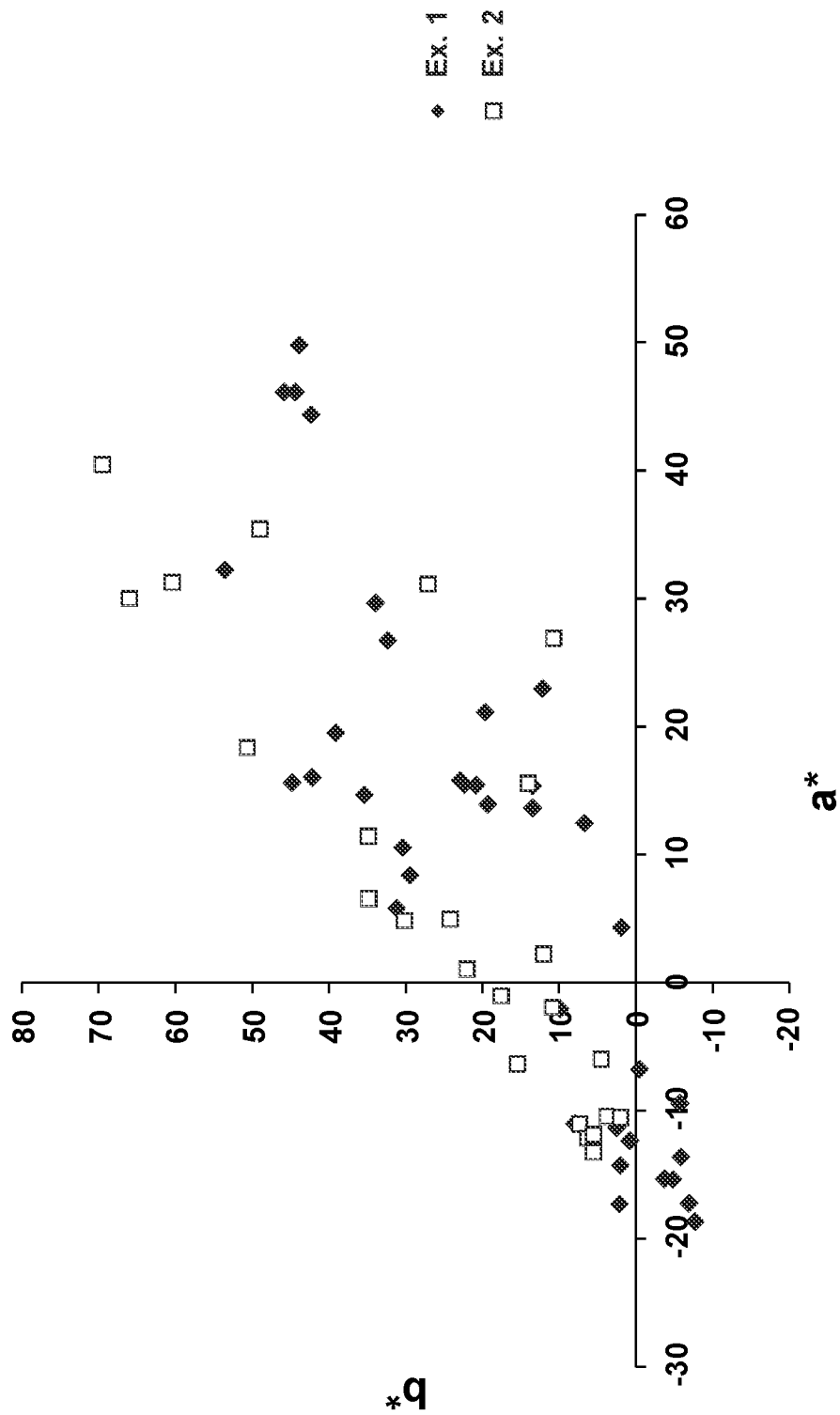
FIG. 2A is a plot of a* and b* transmittance color values for heat treated Examples 1 and 2, according to various features of the present disclosure.

Referring now to Table 9A and FIG. 2A, provided are color coordinates for Examples 1 and 2 resulting from various thermal processing conditions. The L*, a*, b* and X, Y color coordinates were collected under D65-10 illumination, with specular component included, using an X-Rite colorimeter in transmittance mode on polished flats cut from a rolled sheet after heat treatment. It will be understood that one or more appropriate bounds may be drawn around the plotted color coordinates of FIG. 2A which indicates the color space in which Examples 1 and/or 2 may exhibit color coordinates based on their heat treatment.

TABLE 9A

| Ex. | Sample Type | Thickness (mm) | Heat Treatment | L* | a* | b* | x | y |
|---|---|---|---|---|---|---|---|---|
| Ex. 1 | 2 | 0.5 | 28 | 50.59 | −17.25 | −6.94 | 0.2567 | 0.3261 |
| Ex. 1 | 2 | 0.5 | 30 | 62.47 | −13.62 | −5.82 | 0.2743 | 0.3273 |
| Ex. 1 | 2 | 0.5 | 31 | 54.74 | −15.38 | −4.83 | 0.269 | 0.3314 |
| Ex. 1 | 2 | 0.5 | 32 | 49.54 | −15.32 | −3.65 | 0.2689 | 0.3353 |
| Ex. 1 | 2 | 0.5 | 34 | 42.08 | −18.63 | −7.81 | 0.2428 | 0.323 |
| Ex. 1 | 2 | 0.5 | 58 | 25.2 | 44.38 | 42.37 | 0.6455 | 0.3487 |
| Ex. 1 | 2 | 0.5 | 59 | 26.51 | 46.12 | 44.36 | 0.646 | 0.3474 |
| Ex. 1 | 2 | 0.5 | 62 | 28.75 | 46.12 | 45.9 | 0.6334 | 0.3511 |
| Ex. 1 | 1 | 0.5 | 29 | 47.43 | 12.46 | 6.61 | 0.3644 | 0.3363 |
| Ex. 1 | 1 | 0.5 | 8 | 36.19 | −12.32 | 0.74 | 0.2812 | 0.3512 |
| Ex. 1 | 1 | 0.5 | 9 | 68.76 | −9.43 | −5.79 | 0.2844 | 0.3244 |
| Ex. 1 | 1 | 0.5 | 12 | 58.2 | −6.74 | −0.55 | 0.2988 | 0.336 |
| Ex. 1 | 1 | 0.5 | 14 | 35.26 | −2.1 | 9.73 | 0.3441 | 0.3735 |
| Ex. 1 | 1 | 0.5 | 18 | 14.77 | 15.85 | 22.95 | 0.5491 | 0.4127 |
| Ex. 1 | 1 | 0.5 | 19 | 42.84 | 4.28 | 1.97 | 0.3314 | 0.3324 |
| Ex. 1 | 2 | 0.5 | 42 | 58 | −11.35 | 2.4 | 0.2969 | 0.3491 |
| Ex. 1 | 2 | 0.5 | 43 | 43.58 | −14.24 | 1.99 | 0.2842 | 0.3557 |
| Ex. 1 | 2 | 0.5 | 44 | 26.89 | 10.56 | 30.41 | 0.4788 | 0.4275 |
| Ex. 1 | 2 | 0.5 | 46 | 36.3 | −17.27 | 2.11 | 0.2719 | 0.3642 |
| Ex. 1 | 2 | 0.5 | 50 | 24.68 | 8.39 | 29.45 | 0.4742 | 0.4348 |
| Ex. 1 | 2 | 0.5 | 52 | 43.35 | −10.97 | 8.04 | 0.3112 | 0.3744 |
| Ex. 1 | 2 | 0.5 | 51 | 27.47 | 14.64 | 35.41 | 0.5067 | 0.4265 |
| Ex. 1 | 1 | 0.5 | 55 | 34.74 | 16.02 | 42.13 | 0.5048 | 0.4307 |
| Ex. 1 | 1 | 0.5 | 63 | 26.31 | 49.81 | 43.98 | 0.6574 | 0.336 |

TABLE 9A-continued

| Ex. | Sample Type | Thickness (mm) | Heat Treatment | L* | a* | b* | x | y |
|---|---|---|---|---|---|---|---|---|
| Ex. 1 | 1 | 0.5 | 69 | 66.59 | 22.99 | 12.14 | 0.3858 | 0.3372 |
| Ex. 1 | 1 | 0.5 | 30 | 90.15 | 5.77 | 31.15 | 0.379 | 0.385 |
| Ex. 1 | 1 | 0.5 | 31 | 72.99 | 15.44 | 20.7 | 0.3864 | 0.3621 |
| Ex. 1 | 1 | 0.5 | 32 | 67.2 | 19.53 | 39.17 | 0.4405 | 0.3962 |
| Ex. 1 | 1 | 0.5 | 34 | 64.16 | 15.35 | 13.25 | 0.3759 | 0.3481 |
| Ex. 1 | 1 | 0.5 | 42 | 75.02 | 15.61 | 44.8 | 0.4337 | 0.4069 |
| Ex. 1 | 1 | 0.5 | 43 | 72.61 | 15.5 | 22.38 | 0.3905 | 0.3656 |
| Ex. 1 | 1 | 0.5 | 44 | 47.41 | 32.25 | 53.58 | 0.537 | 0.4053 |
| Ex. 1 | 1 | 0.5 | 46 | 52.64 | 21.19 | 19.67 | 0.4184 | 0.3586 |
| Ex. 1 | 1 | 0.5 | 50 | 75.63 | 13.88 | 19.33 | 0.3787 | 0.3601 |
| Ex. 1 | 1 | 0.5 | 51 | 52.27 | 26.72 | 32.44 | 0.4664 | 0.379 |
| Ex. 1 | 1 | 0.5 | 52 | 43.8 | 29.63 | 33.99 | 0.4983 | 0.3792 |
| Ex. 1 | 1 | 0.5 | 55 | 66.38 | 13.63 | 13.39 | 0.3713 | 0.3498 |
| Ex. 2 | 1 | 1.9 | 0A | 6.35 | 26.89 | 10.67 | 0.6629 | 0.3283 |
| Ex. 2 | 1 | 0.58 | 4 | 64.82 | −10.54 | 3.58 | 0.3026 | 0.35 |
| Ex. 2 | 1 | 0.81 | 10 | 59.72 | −11.03 | 7.27 | 0.31 | 0.3625 |
| Ex. 2 | 1 | 0.68 | 12 | 49.83 | −12.09 | 5.95 | 0.3031 | 0.3643 |
| Ex. 2 | 1 | 0.57 | 15 | 56.84 | −11.88 | 5.5 | 0.3035 | 0.3594 |
| Ex. 2 | 1 | 0.8 | 23 | 36.3 | −6.37 | 15.39 | 0.3505 | 0.4029 |
| Ex. 2 | 1 | 0.59 | 70 | 82.04 | −1.08 | 17.53 | 0.3467 | 0.3685 |
| Ex. 2 | 1 | 0.61 | 72 | 82.75 | 1.07 | 22.04 | 0.3587 | 0.3755 |
| Ex. 2 | 1 | 0.59 | 73 | 82.44 | 4.94 | 24.04 | 0.369 | 0.3759 |
| Ex. 2 | 1 | 0.69 | 29 | 64.23 | 4.79 | 30.02 | 0.3947 | 0.3995 |
| Ex. 2 | 1 | 0.85 | 32 | 71.32 | 6.6 | 34.72 | 0.4015 | 0.402 |
| Ex. 2 | 1 | 0.73 | 36 | 39.13 | 31.3 | 60.28 | 0.5678 | 0.4131 |
| Ex. 2 | 1 | 0.71 | 44 | 59.68 | 18.36 | 50.54 | 0.4726 | 0.423 |
| Ex. 2 | 1 | 0.8 | 46 | 33.12 | 35.39 | 49.02 | 0.5841 | 0.3875 |
| Ex. 2 | 1 | 0.65 | 47 | 37.81 | 31.13 | 27.18 | 0.5007 | 0.362 |
| Ex. 2 | 1 | 0.67 | 52 | 52.74 | 30.08 | 65.93 | 0.5367 | 0.4236 |
| Ex. 2 | 1 | 0.37 | 57 | 45.65 | 40.51 | 69.49 | 0.582 | 0.401 |
| Ex. 2 | 1 | 1.03 | 2 | 44.15 | −13.24 | 5.52 | 0.2978 | 0.3675 |
| Ex. 2 | 1 | 0.85 | 7 | 54.63 | −10.62 | 2 | 0.2966 | 0.348 |
| Ex. 2 | 1 | 1.08 | 6 | 35.58 | −6 | 4.57 | 0.3131 | 0.3585 |
| Ex. 2 | 1 | 1.04 | 75 | 57.29 | −1.97 | 10.72 | 0.338 | 0.3633 |
| Ex. 2 | 1 | 1.08 | 76 | 53.72 | 15.63 | 14.1 | 0.3884 | 0.3519 |
| Ex. 2 | 1 | 1.08 | 77 | 39.66 | 11.49 | 34.73 | 0.4604 | 0.422 |
| Ex. 2 | 1 | 1.04 | 71 | 85.63 | 2.2 | 12.07 | 0.3403 | 0.3535 |

Referring now to Table 9B, provided is average absorbance data for Example 1 under a variety of heat treatments for elements. The data was collected using a UV/Vis spectrophotometer in conformance with the measurement rules according to ISO 15368. As can be seen, the different heat treatments applied to Example 1 result in different average absorbance for different wavelength bands.

TABLE 9B

| Ex. | Sample Type | Heat Treatment | 280-380 nm | 380-400 nm | 400-700 nm | 700-2000 nm |
|---|---|---|---|---|---|---|
| Ex. 1 | 1 | 29 | >8 | >8 | 2.91 | 1.00 |
| Ex. 1 | 1 | 63 | 5.40 | 5.17 | 3.55 | 0.22 |
| Ex. 1 | 1 | 69 | 2.07 | 1.96 | 1.46 | 0.14 |
| Ex. 1 | 1 | 2 | >8 | 2.44 | 1.49 | 5.06 |
| Ex. 1 | 1 | 8 | >8 | 4.99 | 2.75 | 5.74 |
| Ex. 1 | 1 | 1 | >8 | 2.05 | 1.31 | 4.58 |
| Ex. 1 | 1 | 12 | >8 | 3.55 | 2.14 | 5.38 |
| Ex. 1 | 1 | 14 | 4.20 | 3.80 | 2.67 | 4.81 |
| Ex. 1 | 1 | 13 | >8 | 3.49 | 2.10 | 5.43 |
| Ex. 1 | 1 | 18 | >8 | >8 | 4.18 | 5.31 |

TABLE 9B-continued

| Ex. | Sample Type | Heat Treatment | 280-380 nm | 380-400 nm | 400-700 nm | 700-2000 nm |
|---|---|---|---|---|---|---|
| Ex. 1 | 1 | 19 | >8 | >8 | 3.61 | 4.30 |
| Ex. 1 | 2 | 30 | >8 | 2.58 | 1.45 | 5.14 |
| Ex. 1 | 2 | 31 | >8 | 3.18 | 1.72 | 5.29 |
| Ex. 1 | 2 | 32 | >8 | 3.51 | 1.92 | 5.44 |
| Ex. 1 | 2 | 34 | >8 | 4.63 | 2.34 | 5.60 |
| Ex. 1 | 2 | 42 | >8 | 2.74 | 1.51 | 4.55 |
| Ex. 1 | 2 | 43 | >8 | 4.39 | 2.26 | 5.32 |
| Ex. 1 | 2 | 44 | >8 | 5.87 | 3.21 | 5.06 |
| Ex. 1 | 2 | 46 | >8 | >7 | 2.69 | 4.77 |
| Ex. 1 | 2 | 50 | >8 | 4.93 | 2.78 | 4.05 |
| Ex. 1 | 2 | 51 | >8 | 5.58 | 3.18 | 5.15 |
| Ex. 1 | 2 | 52 | >8 | 4.21 | 2.20 | 5.45 |
| Ex. 1 | 2 | 55 | 0.63 | 3.85 | 3.26 | 5.40 |
| Ex. 1 | 2 | 30 | 1.30 | 1.37 | 0.64 | 0.10 |
| Ex. 1 | 2 | 31 | >8 | >8 | 2.60 | 0.16 |
| Ex. 1 | 2 | 32 | 0.60 | 2.51 | 2.07 | 0.16 |
| Ex. 1 | 2 | 34 | 2.71 | 2.64 | 1.85 | 0.28 |
| Ex. 1 | 1 | 42 | 1.17 | 1.26 | 0.77 | 0.12 |
| Ex. 1 | 1 | 43 | 1.16 | 1.22 | 0.76 | 0.12 |
| Ex. 1 | 1 | 44 | >8 | >8 | 2.14 | 0.22 |

TABLE 9B-continued

| Ex. | Sample Type | Heat Treatment | 280-380 nm | 380-400 nm | 400-700 nm | 700-2000 nm |
|---|---|---|---|---|---|---|
| Ex. 1 | 1 | 46 | 4.14 | 4.12 | 2.55 | 0.38 |
| Ex. 1 | 1 | 50 | 2.63 | 2.56 | 1.51 | 0.16 |
| Ex. 1 | 1 | 51 | 2.68 | 2.61 | 1.78 | 0.28 |
| Ex. 1 | 1 | 52 | >8 | 2.61 | 2.44 | 0.33 |
| Ex. 1 | 1 | 46 | 1.72 | 1.75 | 1.35 | 0.41 |
| Ex. 1 | 2 | 28 | 4.15 | 3.37 | 1.99 | 4.99 |
| Ex. 1 | 2 | 58 | 2.27 | 5.60 | 2.35 | 0.31 |
| Ex. 1 | 2 | 59 | 2.14 | 5.27 | 2.92 | 0.25 |
| Ex. 1 | 2 | 62 | 2.22 | 5.99 | 2.55 | 0.32 |

Figure 2B:
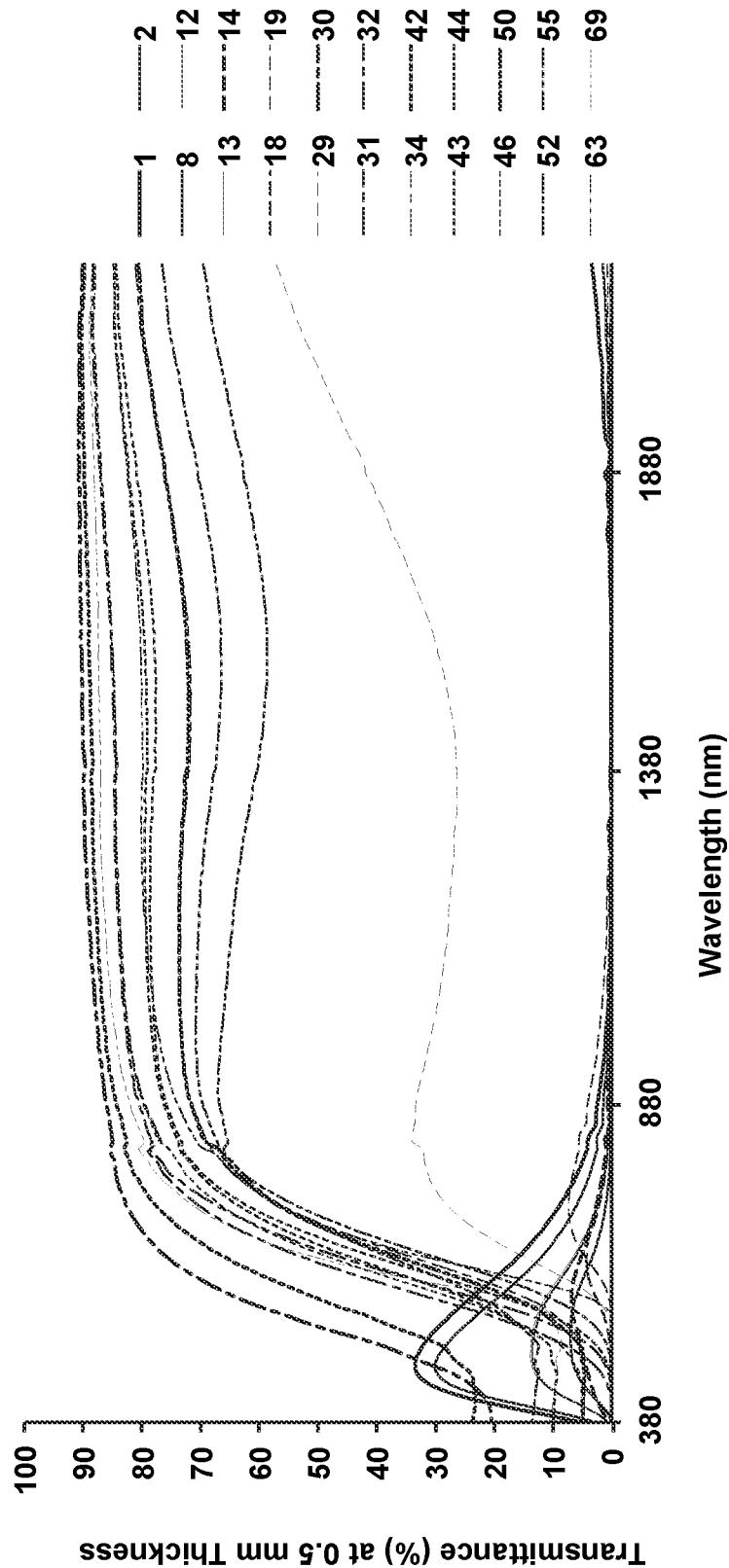
FIG. 2B is a plot of transmittance at 0.5 mm thickness over a wavelength range for different heat treated examples of Example 1, according to various features of the present disclosure.
Figure 2C:
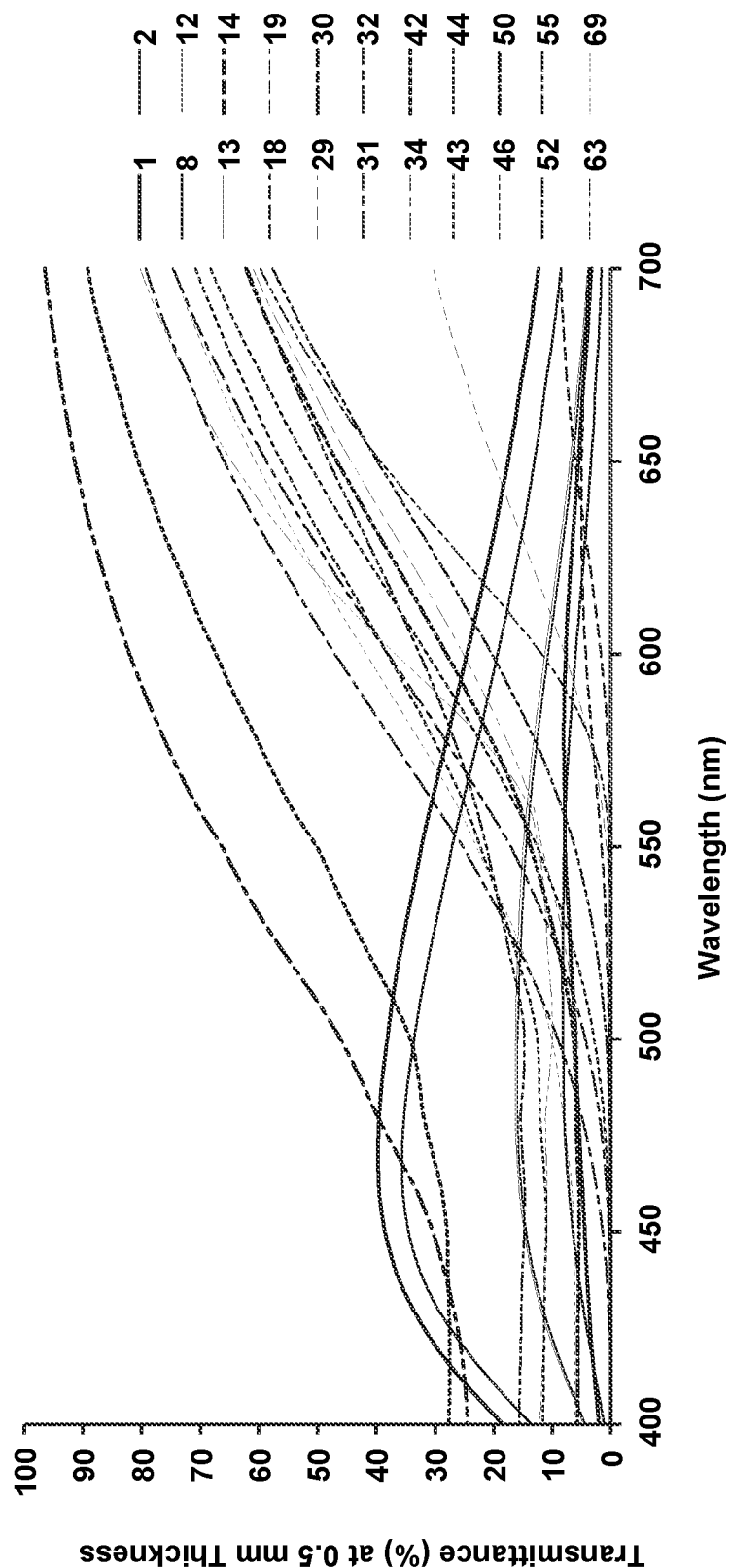
FIG. 2C is a plot of transmittance at 0.5 mm thickness over a wavelength range from 400 nm to 700 nm for different heat treated examples of Example 1, according to various features of the present disclosure.

Referring now to Table 9C and FIGS. 2B and 2C, provided is average transmittance data for Example 1 under a variety of heat treatments for elements having a 0.5 mm thickness. The data was collected using a UV/Vis spectrophotometer in conformance with the measurement rules according to ISO 15368. As can be seen, the different heat treatments applied to Example 1 result in different average transmittance for different wavelength bands.

TABLE 9C

| Ex. | Sample Type | Heat Treatment | 280-380 nm | 380-400 nm | 400-700 nm | 700-2000 nm |
|---|---|---|---|---|---|---|
| Ex. 1 | 1 | 29 | 0.01 | 0.00 | 3.51 | 31.49 |
| Ex. 1 | 1 | 63 | 0.20 | 0.26 | 1.67 | 77.76 |
| Ex. 1 | 1 | 69 | 9.22 | 10.46 | 18.58 | 85.23 |
| Ex. 1 | 1 | 2 | 0.01 | 6.02 | 17.94 | 0.30 |
| Ex. 1 | 1 | 8 | 0.01 | 0.32 | 4.21 | 0.13 |
| Ex. 1 | 1 | 1 | 0.01 | 9.47 | 22.14 | 0.51 |
| Ex. 1 | 1 | 12 | 0.01 | 1.68 | 8.53 | 0.20 |
| Ex. 1 | 1 | 14 | 0.79 | 1.26 | 4.64 | 0.39 |
| Ex. 1 | 1 | 13 | 0.01 | 1.80 | 8.92 | 0.19 |
| Ex. 1 | 1 | 18 | 0.01 | 0.00 | 0.81 | 0.22 |
| Ex. 1 | 1 | 19 | 0.01 | 0.00 | 1.57 | 0.71 |
| Ex. 1 | 2 | 30 | 0.01 | 5.14 | 18.79 | 0.27 |
| Ex. 1 | 2 | 31 | 0.01 | 2.57 | 13.87 | 0.23 |

TABLE 9C-continued

| Ex. | Sample Type | Heat Treatment | 280-380 nm | 380-400 nm | 400-700 nm | 700-2000 nm |
|---|---|---|---|---|---|---|
| Ex. 1 | 2 | 32 | 0.01 | 1.76 | 11.01 | 0.19 |
| Ex. 1 | 2 | 34 | 0.01 | 0.49 | 6.78 | 0.16 |
| Ex. 1 | 2 | 42 | 0.01 | 4.26 | 17.51 | 0.53 |
| Ex. 1 | 2 | 43 | 0.01 | 0.63 | 7.40 | 0.22 |
| Ex. 1 | 2 | 44 | 0.01 | 0.12 | 2.49 | 0.30 |
| Ex. 1 | 2 | 46 | 0.01 | 0.00 | 4.50 | 0.41 |
| Ex. 1 | 2 | 50 | 0.01 | 0.34 | 4.08 | 0.95 |
| Ex. 1 | 2 | 51 | 0.01 | 0.16 | 2.58 | 0.27 |
| Ex. 1 | 2 | 52 | 0.01 | 0.78 | 7.96 | 0.19 |
| Ex. 1 | 2 | 55 | 48.50 | 1.19 | 2.35 | 0.20 |
| Ex. 1 | 2 | 30 | 22.35 | 20.58 | 47.89 | 88.75 |
| Ex. 1 | 2 | 31 | 0.01 | 0.00 | 5.03 | 83.01 |
| Ex. 1 | 2 | 32 | 49.89 | 5.54 | 9.26 | 83.46 |
| Ex. 1 | 2 | 34 | 4.42 | 4.76 | 11.93 | 72.04 |
| Ex. 1 | 1 | 42 | 25.89 | 23.54 | 41.12 | 87.22 |
| Ex. 1 | 1 | 43 | 26.23 | 24.53 | 41.85 | 87.60 |
| Ex. 1 | 1 | 44 | 0.01 | 0.00 | 8.55 | 77.26 |
| Ex. 1 | 1 | 46 | 0.85 | 0.87 | 5.32 | 64.94 |
| Ex. 1 | 1 | 50 | 4.84 | 5.26 | 17.62 | 82.78 |
| Ex. 1 | 1 | 51 | 4.57 | 4.94 | 12.94 | 72.20 |
| Ex. 1 | 1 | 52 | 0.01 | 4.94 | 6.03 | 68.09 |
| Ex. 1 | 1 | 46 | 13.83 | 13.36 | 21.12 | 62.42 |
| Ex. 1 | 2 | 28 | 0.84 | 2.07 | 10.11 | 0.32 |
| Ex. 1 | 2 | 58 | 7.35 | 0.16 | 6.66 | 70.02 |
| Ex. 1 | 2 | 59 | 8.53 | 0.23 | 3.48 | 74.85 |
| Ex. 1 | 2 | 62 | 7.76 | 0.10 | 5.28 | 68.84 |

Figure 3:
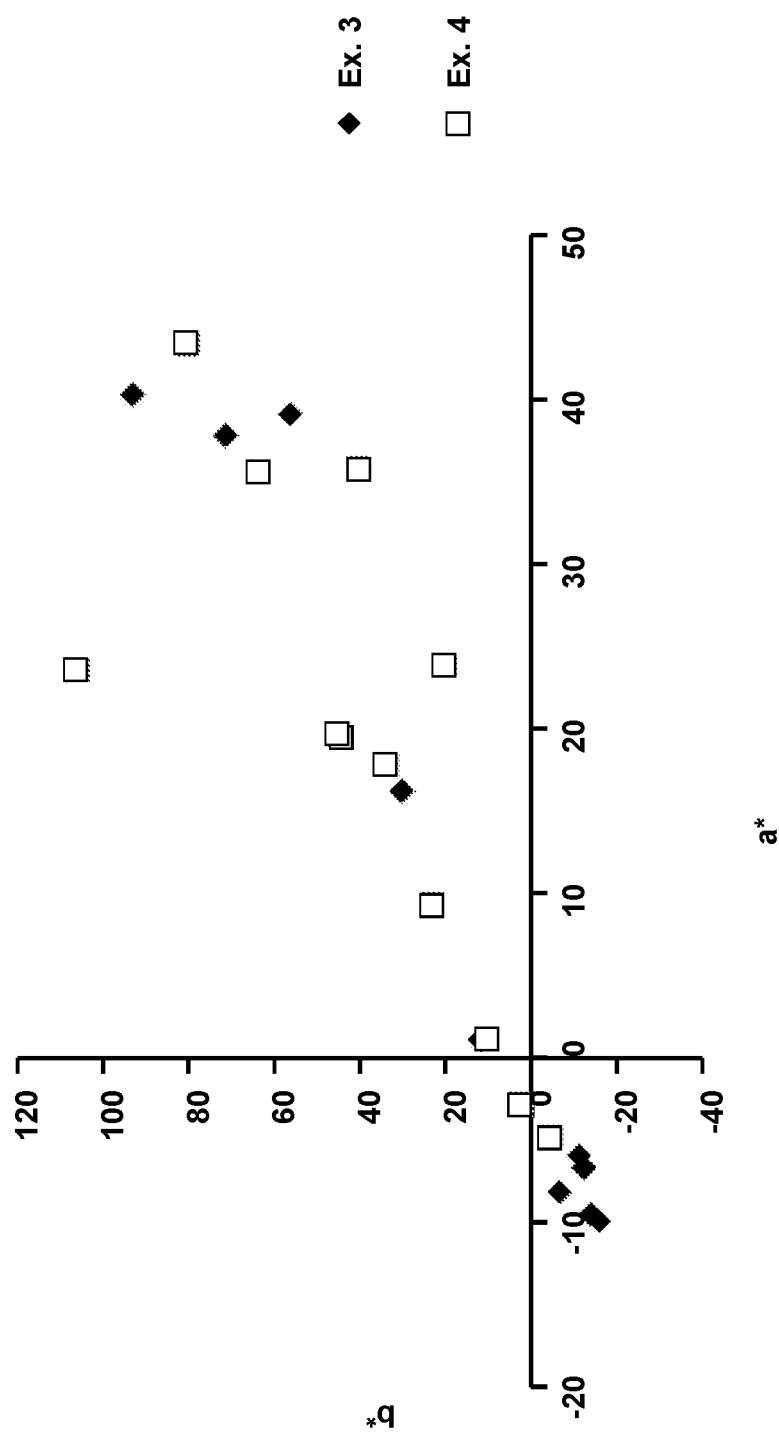
FIG. 3 is a plot of a* and b* transmittance color values for heat treated Examples 3 and 4, according to various features of the present disclosure.

Referring now to Table. 10A and FIG. 3, provided are color coordinates for Examples 3 and 4 resulting from various thermal processing conditions. The L*, a*, b* and X, Y color coordinates were collected under D65-10 illumination, with specular component included, using an X-Rite colorimeter in transmittance mode on polished flats cut from rolled sheet after heat treatment. It will be understood that one or more appropriate bound may be drawn around the plotted color coordinates of FIG. 3 which indicates the color space in which Examples 3 and/or 4 may exhibit color coordinates based on their heat treatment.

TABLE 10A

| Ex. | Sample Type | Thickness (mm) | Heat Treatment | L* | a* | b* | x | y |
|---|---|---|---|---|---|---|---|---|
| Ex. 3 | 1 | 0.3 | 84 | 58.53 | 1.07 | 12.01 | 0.3473 | 0.3627 |
| Ex. 3 | 1 | 0.3 | 29 | 48.66 | 16.21 | 30.08 | 0.4421 | 0.3935 |
| Ex. 3 | 1 | 0.3 | 85 | 35.29 | 39.11 | 56.22 | 0.5985 | 0.3872 |
| Ex. 3 | 1 | 0.3 | 47 | 50.79 | 37.79 | 71.52 | 0.5646 | 0.4114 |
| Ex. 3 | 1 | 0.3 | 87 | 61.97 | 40.27 | 93.17 | 0.5636 | 0.4233 |
| Ex. 3 | 1 | 0.3 | 88 | 68.28 | −5.93 | −11.15 | 0.2784 | 0.3085 |
| Ex. 3 | 1 | 0.3 | 4 | 58.16 | −6.66 | −12.23 | 0.2696 | 0.3029 |
| Ex. 3 | 1 | 0.3 | 7 | 46.02 | −9.92 | −15.68 | 0.2443 | 0.2887 |
| Ex. 3 | 1 | 0.3 | 13 | 50.16 | −9.51 | −13.78 | 0.2543 | 0.297 |
| Ex. 3 | 1 | 0.3 | 15 | 42.9 | −8.15 | −6.83 | 0.2717 | 0.316 |
| Ex. 4 | 1 | 0.3 | 84 | 61.17 | 17.83 | 34.07 | 0.4347 | 0.3921 |
| Ex. 4 | 1 | 0.3 | 29 | 45.54 | 35.59 | 63.9 | 0.5644 | 0.408 |
| Ex. 4 | 1 | 0.3 | 85 | 47.11 | 35.77 | 40.43 | 0.5203 | 0.3788 |
| Ex. 4 | 1 | 0.3 | 47 | 69.94 | 23.55 | 106.22 | 0.5269 | 0.4619 |
| Ex. 4 | 1 | 0.3 | 87 | 60.79 | 43.39 | 80.46 | 0.563 | 0.4104 |
| Ex. 4 | 1 | 0.3 | 88 | 58.17 | −4.85 | −4.37 | 0.2929 | 0.3234 |
| Ex. 4 | 1 | 0.3 | 89 | 61.24 | −2.81 | 2.38 | 0.3143 | 0.34 |
| Ex. 4 | 1 | 0.3 | 4 | 41.97 | 19.55 | 44.53 | 0.5012 | 0.4217 |
| Ex. 4 | 1 | 0.3 | 7 | 41.72 | 1.17 | 10.41 | 0.352 | 0.366 |
| Ex. 4 | 1 | 0.3 | 13 | 53.09 | 9.34 | 23 | 0.3995 | 0.384 |
| Ex. 4 | 1 | 0.3 | 15 | 41.29 | 23.85 | 20.44 | 0.4488 | 0.359 |
| Ex. 4 | 1 | 0.3 | 17 | 26.92 | 19.71 | 45.33 | 0.5587 | 0.4349 |

Referring now to Table 10B, provided is average absorbance data for Examples 3 and 4 under a variety of heat treatments for elements. The average absorbance is provided in units of optical density per millimeter (OD/mm). As can be seen, the different heat treatments applied to Examples 3 and 4 result in different average absorbance for different wavelength bands.

TABLE 10B

| Ex. | Sample Type | Heat Treatment | 280-380 nm | 380-400 nm | 400-700 nm | 700-2000 nm |
|---|---|---|---|---|---|---|
| Ex. 3 | 1 | 84 | >8 | 2.81 | 2.32 | 1.49 |
| Ex. 3 | 1 | 29 | >8 | 4.83 | 3.85 | 1.33 |
| Ex. 3 | 1 | 85 | >8 | 5.83 | 5.32 | 0.83 |
| Ex. 3 | 1 | 47 | 4.47 | 3.82 | 2.96 | 0.44 |
| Ex. 3 | 1 | 87 | >8 | 3.41 | 3.99 | 0.21 |
| Ex. 3 | 1 | 88 | >8 | 1.81 | 1.96 | 2.22 |
| Ex. 3 | 1 | 4 | >8 | 2.59 | 2.57 | 3.59 |
| Ex. 3 | 1 | 7 | >8 | 3.82 | 3.51 | 5.21 |
| Ex. 3 | 1 | 13 | >8 | 3.08 | 2.92 | 3.97 |
| Ex. 3 | 1 | 15 | >8 | 3.68 | 3.24 | 4.24 |
| Ex. 4 | 1 | 84 | 6.70 | 3.33 | 2.53 | 0.48 |
| Ex. 4 | 1 | 29 | 4.08 | 3.39 | 2.70 | 0.46 |
| Ex. 4 | 1 | 85 | 7.52 | 7.40 | 3.81 | 0.45 |
| Ex. 4 | 1 | 47 | 5.63 | 4.97 | 3.45 | 0.20 |
| Ex. 4 | 1 | 87 | 6.67 | 3.86 | 2.61 | 0.17 |
| Ex. 4 | 1 | 88 | >8 | 2.40 | 2.47 | 1.99 |
| Ex. 4 | 1 | 89 | >8 | 2.42 | 2.30 | 1.55 |
| Ex. 4 | 1 | 4 | 4.93 | 3.79 | 3.14 | 1.00 |
| Ex. 4 | 1 | 7 | >8 | 5.27 | 5.15 | 4.31 |
| Ex. 4 | 1 | 13 | >8 | 6.87 | 4.84 | 0.94 |
| Ex. 4 | 1 | 15 | >8 | 6.87 | 4.84 | 0.94 |
| Ex. 4 | 1 | 17 | >8 | 6.18 | 5.43 | 2.16 |

Referring now to Table 10C, provided is average transmittance data for Examples 3 and 4 under a variety of heat treatments for elements having a 0.5 mm thickness. The data was collected using a UV/Vis spectrophotometer in conformance with the measurement rules according to ISO 15368.

As can be seen, the different heat treatments applied to Example 1 result in different average transmittance for different wavelength bands.

TABLE 10C

| Ex. | Sample Type | Heat Treatment | 280-380 nm | 380-400 nm | 400-700 nm | 700-2000 nm |
|---|---|---|---|---|---|---|
| Ex. 3 | 1 | 84 | 0.01 | 3.94 | 6.96 | 18.06 |
| Ex. 3 | 1 | 29 | 0.01 | 0.38 | 1.18 | 21.74 |
| Ex. 3 | 1 | 85 | 0.01 | 0.12 | 0.22 | 38.59 |
| Ex. 3 | 1 | 47 | 0.58 | 1.23 | 3.32 | 60.36 |
| Ex. 3 | 1 | 87 | 0.01 | 1.97 | 1.01 | 78.53 |
| Ex. 3 | 1 | 88 | 0.01 | 12.41 | 10.42 | 7.74 |
| Ex. 3 | 1 | 4 | 0.01 | 5.08 | 5.17 | 1.61 |
| Ex. 3 | 1 | 7 | 0.01 | 1.23 | 1.75 | 0.25 |
| Ex. 3 | 1 | 13 | 0.01 | 2.88 | 3.48 | 1.03 |
| Ex. 3 | 1 | 15 | 0.01 | 1.45 | 2.41 | 0.76 |
| Ex. 4 | 1 | 84 | 0.04 | 2.15 | 5.45 | 57.36 |
| Ex. 4 | 1 | 29 | 0.91 | 2.02 | 4.47 | 58.65 |
| Ex. 4 | 1 | 85 | 0.02 | 0.02 | 1.25 | 59.25 |
| Ex. 4 | 1 | 47 | 0.15 | 0.33 | 1.88 | 79.64 |
| Ex. 4 | 1 | 87 | 0.05 | 1.18 | 4.95 | 82.52 |
| Ex. 4 | 1 | 88 | 0.01 | 6.29 | 5.80 | 10.16 |
| Ex. 4 | 1 | 89 | 0.01 | 6.15 | 7.11 | 16.83 |
| Ex. 4 | 1 | 4 | 0.34 | 1.27 | 2.70 | 31.61 |
| Ex. 4 | 1 | 7 | 0.01 | 0.23 | 0.27 | 0.70 |
| Ex. 4 | 1 | 13 | 0.01 | 0.04 | 0.38 | 34.07 |
| Ex. 4 | 1 | 15 | 0.01 | 0.04 | 0.38 | 34.07 |
| Ex. 4 | 1 | 17 | 0.01 | 0.08 | 0.19 | 8.33 |

Figure 4:
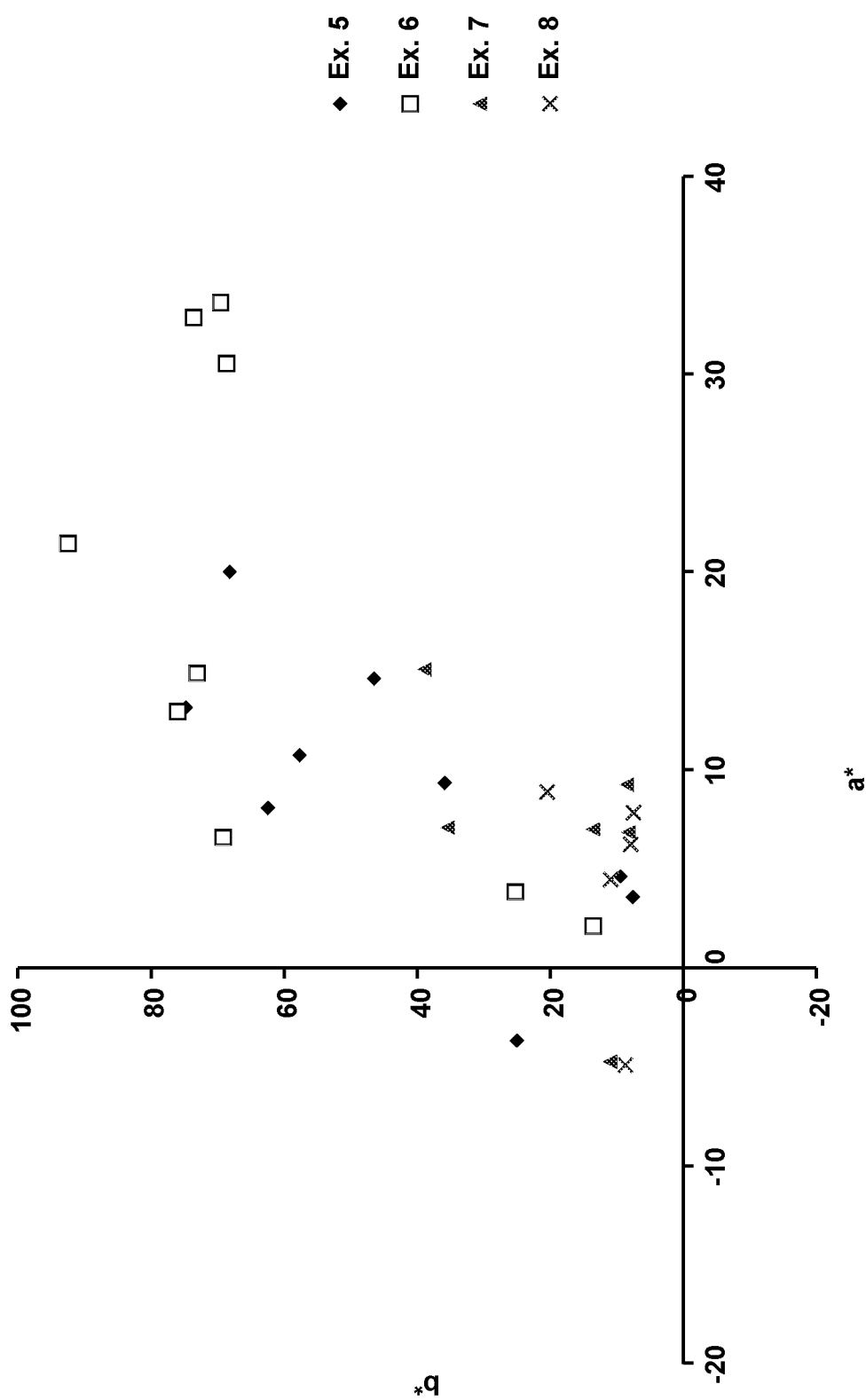
FIG. 4 is a plot of a* and b* transmittance color values for heat treated Examples 5, 6, 7 and 8, according to various features of the present disclosure.

Referring now to Table 11A and FIG. 4, provided are color coordinates for Examples 5-8 resulting from various thermal processing conditions. The L*, a*, b* and x, y color coordinates were collected under D65-10 illumination, with specular component included, using an X-Rite colorimeter in transmittance mode on polished flats cut from rolled sheet after heat treatment. It will be understood that one or more appropriate bounds may be drawn around the plotted color coordinates of FIG. 4 which indicates the color space in which Examples 5, 6, 7, and/or 8 may exhibit color coordinates based on their heat treatment.

TABLE 11A

| Ex. | Sample Type | Thickness (mm) | Heat Treatment | L* | a* | b* | x | y |
|---|---|---|---|---|---|---|---|---|
| Ex. 5 | 1 | 0.3 | 90 | 92.4 | 3.53 | 7.37 | 0.332 | 0.3424 |
| Ex. 5 | 1 | 0.3 | 91 | 65.62 | 10.72 | 57.57 | 0.4593 | 0.4427 |
| Ex. 5 | 1 | 0.3 | 28 | 91.27 | 4.65 | 9.54 | 0.3378 | 0.3457 |
| Ex. 5 | 1 | 0.3 | 92 | 74.04 | 14.6 | 46.47 | 0.4362 | 0.4118 |
| Ex. 5 | 1 | 0.3 | 34 | 83.32 | 9.33 | 35.82 | 0.3979 | 0.3934 |
| Ex. 5 | 1 | 0.3 | 46 | 72.4 | 20.02 | 68.31 | 0.4836 | 0.4375 |
| Ex. 5 | 1 | 0.3 | 93 | 62.83 | -3.67 | 25.14 | 0.3673 | 0.4002 |
| Ex. 5 | 1 | 0.3 | 94 | 50.25 | 8.07 | 62.3 | 0.4836 | 0.4691 |
| Ex. 5 | 1 | 0.3 | 95 | 49.84 | 13.17 | 74.5 | 0.5101 | 0.4696 |
| Ex. 6 | 1 | 0.3 | 90 | 92.09 | 2.11 | 13.61 | 0.3413 | 0.3551 |
| Ex. 6 | 1 | 0.3 | 91 | 59.22 | 12.96 | 75.72 | 0.4975 | 0.4665 |
| Ex. 6 | 1 | 0.3 | 28 | 89 | 3.91 | 25.11 | 0.366 | 0.3762 |
| Ex. 6 | 1 | 0.3 | 92 | 71.6 | 14.94 | 73.1 | 0.4814 | 0.452 |
| Ex. 6 | 1 | 0.3 | 34 | 68.46 | 21.49 | 92.48 | 0.517 | 0.4591 |
| Ex. 6 | 1 | 0.3 | 46 | 58.29 | 33.7 | 69.35 | 0.537 | 0.4195 |
| Ex. 6 | 1 | 0.3 | 93 | 49.13 | 6.62 | 69.04 | 0.4893 | 0.4812 |
| Ex. 6 | 1 | 0.3 | 94 | 40.71 | 30.57 | 68.59 | 0.5722 | 0.4238 |
| Ex. 6 | 1 | 0.3 | 95 | 43.35 | 32.9 | 73.27 | 0.575 | 0.4219 |
| Ex. 7 | 1 | 1 | 96 | 87.04 | 9.22 | 8.19 | 0.343 | 0.3402 |
| Ex. 7 | 1 | 1 | 88 | 88.6 | 6.82 | 8.07 | 0.3388 | 0.3416 |
| Ex. 7 | 1 | 1 | 97 | 63.18 | 7 | 13.44 | 0.3607 | 0.3579 |
| Ex. 7 | 1 | 1 | 98 | 43.66 | -4.77 | 11.02 | 0.3369 | 0.3759 |
| Ex. 7 | 1 | 1 | 8 | 49.56 | 7.13 | 35.19 | 0.4307 | 0.4215 |
| Ex. 7 | 1 | 1 | 14 | 77.96 | 15.06 | 38.85 | 0.4183 | 0.3954 |
| Ex. 8 | 1 | 1 | 96 | 87.96 | 7.81 | 7.24 | 0.3389 | 0.3394 |
| Ex. 8 | 1 | 1 | 88 | 89.26 | 6.26 | 7.91 | 0.3376 | 0.3417 |
| Ex. 8 | 1 | 1 | 97 | 71.27 | 4.44 | 10.71 | 0.3456 | 0.3519 |

TABLE 11A-continued

| Ex. | Sample Type | Thickness (mm) | Heat Treatment | L* | a* | b* | x | y |
|---|---|---|---|---|---|---|---|---|
| Ex. 8 | 1 | 1 | 98 | 60.16 | −4.93 | 8.7 | 0.326 | 0.3598 |
| Ex. 8 | 1 | 1 | 8 | 54.45 | −3.73 | 14.59 | 0.3455 | 0.3781 |
| Ex. 8 | 1 | 1 | 14 | 86.62 | 8.87 | 20.56 | 0.3663 | 0.364 |

Referring now to Table 11B, provided is average absorbance data for Examples 5-8 under a variety of heat treatments for elements. The average absorbance is provided in units of optical density per millimeter (OD/mm). The data was collected using a UV/Vis spectrophotometer in conformance with the measurement rules according to ISO 15368. As can be seen, the different heat treatments applied to Examples 5-8 result in different average absorbance for different wavelength bands.

TABLE 11B

| Ex. | Sample Type | Heat Treatment | 280-380 nm | 380-400 nm | 400-700 nm | 700-2000 nm |
|---|---|---|---|---|---|---|
| Ex. 5 | 1 | 90 | 3.01 | 0.49 | 0.35 | 0.14 |
| Ex. 5 | 1 | 91 | 5.62 | 2.57 | 1.92 | 1.60 |
| Ex. 5 | 1 | 28 | 3.51 | 0.83 | 0.74 | 0.18 |
| Ex. 5 | 1 | 92 | 3.34 | 1.48 | 1.21 | 0.35 |
| Ex. 5 | 1 | 34 | 3.81 | 1.06 | 0.95 | 0.17 |
| Ex. 5 | 1 | 46 | 3.84 | 1.84 | 1.75 | 0.16 |
| Ex. 5 | 1 | 93 | 6.96 | 3.25 | 2.12 | 5.58 |
| Ex. 5 | 1 | 94 | >8 | 6.35 | 4.07 | 4.56 |
| Ex. 5 | 1 | 95 | >8 | 7.38 | 3.66 | 4.18 |
| Ex. 6 | 1 | 90 | 2.08 | 0.57 | 0.38 | 0.14 |
| Ex. 6 | 1 | 91 | 7.02 | 5.27 | 3.20 | 2.01 |
| Ex. 6 | 1 | 28 | 2.62 | 0.80 | 0.63 | 0.14 |
| Ex. 6 | 1 | 92 | 4.24 | 3.85 | 2.30 | 0.33 |
| Ex. 6 | 1 | 34 | 3.44 | 4.38 | 3.05 | 0.16 |
| Ex. 6 | 1 | 46 | 4.79 | 6.72 | 3.62 | 0.18 |
| Ex. 6 | 1 | 93 | 7.97 | 6.95 | 4.40 | 5.01 |
| Ex. 6 | 1 | 94 | >8 | >8 | 3.57 | 1.72 |
| Ex. 6 | 1 | 95 | >8 | >8 | 2.97 | 1.62 |
| Ex. 7 | 1 | 96 | 1.57 | 0.26 | 0.14 | 0.04 |
| Ex. 7 | 1 | 88 | 1.60 | 0.26 | 0.13 | 0.05 |
| Ex. 7 | 1 | 97 | 2.83 | 1.03 | 0.56 | 0.93 |
| Ex. 7 | 1 | 98 | 3.57 | 2.10 | 0.99 | 2.59 |
| Ex. 7 | 1 | 8 | 3.18 | 1.56 | 0.94 | 1.52 |
| Ex. 7 | 1 | 14 | 2.16 | 0.66 | 0.43 | 0.32 |
| Ex. 8 | 1 | 96 | 1.71 | 0.26 | 0.14 | 0.05 |
| Ex. 8 | 1 | 88 | 1.46 | 0.28 | 0.14 | 0.05 |
| Ex. 8 | 1 | 97 | 2.32 | 0.79 | 0.45 | 0.70 |
| Ex. 8 | 1 | 98 | 3.08 | 1.15 | 0.55 | 1.28 |
| Ex. 8 | 1 | 8 | 3.12 | 1.60 | 0.81 | 2.01 |
| Ex. 8 | 1 | 14 | 1.05 | 0.30 | 0.18 | 0.07 |

Referring now to Table 11C, provided is average transmittance data in % transmission for Examples 5-8 under a variety of heat treatments for elements having a 0.5 mm thickness. The data was collected using a UV/Vis spectrophotometer in conformance with the measurement rules according to ISO 15368. As can be seen, the different heat treatments applied to Examples 5-8 result in different average transmittance for different wavelength bands.

TABLE 11C

| Ex. | Sample Type | Heat Treatment | 280-380 nm | 380-400 nm | 400-700 nm | 700-2000 nm |
|---|---|---|---|---|---|---|
| Ex. 5 | 1 | 90 | 3.12 | 57.01 | 66.46 | 85.30 |
| Ex. 5 | 1 | 91 | 0.16 | 5.17 | 10.94 | 15.84 |
| Ex. 5 | 1 | 28 | 1.75 | 38.34 | 42.65 | 81.74 |
| Ex. 5 | 1 | 92 | 2.13 | 18.13 | 24.70 | 66.56 |
| Ex. 5 | 1 | 34 | 1.24 | 29.55 | 33.46 | 82.65 |

TABLE 11C-continued

| Ex. | Sample Type | Heat Treatment | 280-380 nm | 380-400 nm | 400-700 nm | 700-2000 nm |
|---|---|---|---|---|---|---|
| Ex. 5 | 1 | 46 | 1.20 | 12.02 | 13.33 | 83.11 |
| Ex. 5 | 1 | 93 | 0.03 | 2.38 | 8.70 | 0.16 |
| Ex. 5 | 1 | 94 | 0.00 | 0.07 | 0.92 | 0.53 |
| Ex. 5 | 1 | 95 | 0.00 | 0.02 | 1.47 | 0.82 |
| Ex. 6 | 1 | 90 | 9.07 | 51.91 | 64.33 | 84.97 |
| Ex. 6 | 1 | 91 | 0.03 | 0.23 | 2.52 | 9.93 |
| Ex. 6 | 1 | 28 | 4.90 | 39.74 | 48.24 | 84.81 |
| Ex. 6 | 1 | 92 | 0.76 | 1.19 | 7.07 | 68.66 |
| Ex. 6 | 1 | 34 | 1.92 | 0.64 | 3.00 | 82.99 |
| Ex. 6 | 1 | 46 | 0.40 | 0.04 | 1.55 | 81.34 |
| Ex. 6 | 1 | 93 | 0.01 | 0.03 | 0.63 | 0.31 |
| Ex. 6 | 1 | 94 | 0.00 | 0.00 | 1.64 | 13.85 |
| Ex. 6 | 1 | 95 | 0.00 | 0.00 | 3.25 | 15.46 |
| Ex. 7 | 1 | 96 | 16.40 | 74.38 | 85.56 | 95.07 |
| Ex. 7 | 1 | 88 | 15.85 | 74.23 | 85.87 | 94.80 |
| Ex. 7 | 1 | 97 | 3.84 | 30.43 | 52.69 | 34.46 |
| Ex. 7 | 1 | 98 | 1.65 | 8.90 | 32.16 | 5.06 |
| Ex. 7 | 1 | 8 | 2.58 | 16.66 | 33.73 | 17.39 |
| Ex. 7 | 1 | 14 | 8.29 | 46.60 | 60.89 | 69.21 |
| Ex. 8 | 1 | 96 | 13.92 | 73.87 | 85.53 | 94.71 |
| Ex. 8 | 1 | 88 | 18.70 | 72.69 | 85.07 | 94.45 |
| Ex. 8 | 1 | 97 | 6.93 | 40.48 | 59.79 | 44.60 |
| Ex. 8 | 1 | 98 | 2.90 | 26.71 | 52.89 | 22.96 |
| Ex. 8 | 1 | 8 | 2.76 | 15.83 | 39.51 | 9.85 |
| Ex. 8 | 1 | 14 | 29.74 | 70.49 | 81.20 | 92.57 |

Figure 5:
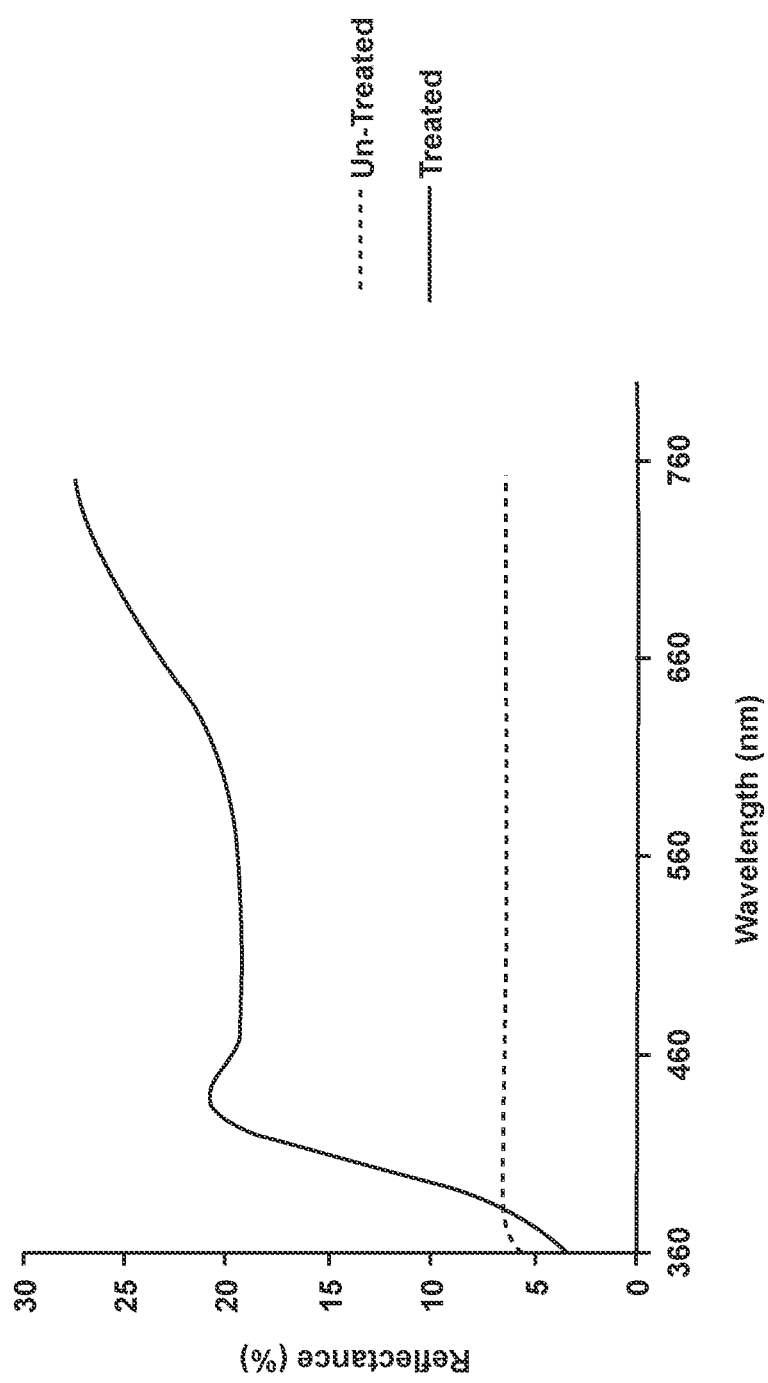
FIG. 5 is a plot of reflectance vs. wavelength for an example in both a treated and an untreated state.

Referring now to FIG. 5, depicted is a plot of the reflectance vs wavelength for reflective examples of the element. The reflective example of the element was formed by annealing a 1.9 mm thick polished sample that was heat treated at 565° C. for 1 minute, cooling to 475° C. at 5° C./min, and then cooled to room temperature at furnace rate. The sample had a composition of $SiO_2$ of about 63.05 Mol %, $B_2O_3$ of about 11.38 mol %, $Al_2O_3$ of about 10.53 mol %, $Li_2O$ of about 5.31 mol %, $Na_2O$ of about 6.00 mol %, CaO of about 0.02 mol %, $SnO_2$ of about 0.11 mol %, $WO_3$ of about 3.48 mol % and Ag of about 0.105 mol %. After the heat treating, the element was placed in a furnace filled with an atmosphere of forming gas (i.e., 98% $N_2$ and 2% $H_2$) at 600° C. for 5 minutes and then cooled to room temperature in ambient air. The reflectance spectra were collected before and after the reflective forming treatment. The reflectance spectra demonstrate that the reflectance significantly increases due to the formation of a reflective layer. Reflected color measurements were collected on the pre and post-treated sample with an X-Rite colorimeter under D65-10 illumination conditions in reflection mode. The color coordinates are provided in Table 12 below.

TABLE 12

| State | L* | a* | b* |
|---|---|---|---|
| Un-Treated | 34.51 | 5.18 | −4.76 |
| Treated | 20.76 | 0.66 | −1.33 |

Referring now to Table 11, provided is a set of exemplary compositions of the element (Exs. 9-66) which may have $SiO_2$ from about 54.01 mol % to about 67.66 mol %, $Al_2O_3$ from about 9.55 mol % to about 11.42 mol %, $B_2O_3$ from about 9.36 mol % to about 15.34 mol %, $R_2O$ from about 9.79 mol % to about 13.72 mol %, RO from about 0.00 mol % to about 0.22 mol %, $WO_3$ from about 1.74 mol % to about 4.48 mol %, $MoO_3$ from about 0 mol % to about 1.91 mol %, $SnO_2$ from about 0.0 mol % to about 0.21 mol %, $V_2O_5$ from about 0 mol % to about 0.03 mol %, Ag from about 0 mol % to about 0.48 mol % and Au from about 0 mol % to about 0.01 mol %. The compositions of Table 11 are provided in an as-batched state within a crucible.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the

TABLE 11

| Ex. | $SiO_2$ | $Al_2O_3$ | $B_2O_3$ | $Li_2O$ | $Na_2O$ | $K_2O$ | MgO | CaO | $SnO_2$ | $WO_3$ | $MoO_3$ | Ag | Au | $V_2O_5$ | Cu |
|---|---|---|---|---|---|---|---|---|---|---|---|---|---|---|---|
| 9  | 63.05 | 10.54 | 11.38 | 5.31 | 5.99 | 0.02 | 0.00 | 0.02 | 0.105 | 3.476 | 0.000 | 0.105 | 0.000 | 0.005 | 0.000 |
| 10 | 63.05 | 10.54 | 11.38 | 5.31 | 5.99 | 0.02 | 0.00 | 0.02 | 0.105 | 3.476 | 0.000 | 0.105 | 0.000 | 0.010 | 0.000 |
| 11 | 63.04 | 10.54 | 11.37 | 5.31 | 5.99 | 0.02 | 0.00 | 0.02 | 0.105 | 3.476 | 0.000 | 0.105 | 0.000 | 0.020 | 0.000 |
| 12 | 67.51 | 9.66  | 9.47  | 4.87 | 5.02 | 0.02 | 0.00 | 0.00 | 0.048 | 3.189 | 0.000 | 0.097 | 0.000 | 0.010 | 0.000 |
| 13 | 63.07 | 10.55 | 11.38 | 5.31 | 5.99 | 0.02 | 0.00 | 0.02 | 0.050 | 3.477 | 0.000 | 0.105 | 0.000 | 0.020 | 0.000 |
| 14 | 63.03 | 10.54 | 11.37 | 5.31 | 5.99 | 0.02 | 0.00 | 0.02 | 0.105 | 3.475 | 0.000 | 0.105 | 0.000 | 0.030 | 0.000 |
| 15 | 66.86 | 9.57  | 9.38  | 4.82 | 4.97 | 0.02 | 0.00 | 0.02 | 0.048 | 3.829 | 0.000 | 0.000 | 0.000 | 0.000 | 0.478 |
| 16 | 67.13 | 9.61  | 9.42  | 4.84 | 4.99 | 0.02 | 0.02 | 0.02 | 0.048 | 3.844 | 0.000 | 0.048 | 0.000 | 0.000 | 0.000 |
| 17 | 67.10 | 9.61  | 9.41  | 4.84 | 4.99 | 0.02 | 0.02 | 0.02 | 0.048 | 3.843 | 0.000 | 0.096 | 0.000 | 0.000 | 0.000 |
| 18 | 66.85 | 9.57  | 9.38  | 4.82 | 4.97 | 0.02 | 0.02 | 0.02 | 0.048 | 3.828 | 0.000 | 0.478 | 0.000 | 0.000 | 0.000 |
| 19 | 67.12 | 9.61  | 9.42  | 4.84 | 4.99 | 0.02 | 0.00 | 0.02 | 0.048 | 3.459 | 0.000 | 0.480 | 0.000 | 0.000 | 0.000 |
| 20 | 66.74 | 9.55  | 9.36  | 4.81 | 4.96 | 0.02 | 0.00 | 0.00 | 0.048 | 3.822 | 0.000 | 0.478 | 0.000 | 0.000 | 0.000 |
| 21 | 67.13 | 9.61  | 9.42  | 4.84 | 4.99 | 0.02 | 0.00 | 0.00 | 0.048 | 3.556 | 0.000 | 0.288 | 0.000 | 0.000 | 0.000 |
| 22 | 67.11 | 9.61  | 9.42  | 4.84 | 4.99 | 0.02 | 0.00 | 0.00 | 0.048 | 3.363 | 0.000 | 0.192 | 0.000 | 0.000 | 0.048 |
| 23 | 66.84 | 9.57  | 9.38  | 4.82 | 4.97 | 0.02 | 0.00 | 0.00 | 0.048 | 3.349 | 0.000 | 0.191 | 0.000 | 0.000 | 0.048 |
| 24 | 67.18 | 9.62  | 9.42  | 4.85 | 5.00 | 0.02 | 0.00 | 0.00 | 0.048 | 3.366 | 0.000 | 0.192 | 0.000 | 0.000 | 0.000 |
| 25 | 66.69 | 9.55  | 9.36  | 4.81 | 4.96 | 0.02 | 0.00 | 0.00 | 0.048 | 3.342 | 0.000 | 0.191 | 0.000 | 0.000 | 0.000 |
| 26 | 67.66 | 9.69  | 9.49  | 4.88 | 5.03 | 0.02 | 0.00 | 0.00 | 0.048 | 3.003 | 0.000 | 0.097 | 0.000 | 0.000 | 0.000 |
| 27 | 67.35 | 9.64  | 9.45  | 4.86 | 5.01 | 0.02 | 0.00 | 0.02 | 0.048 | 3.374 | 0.000 | 0.193 | 0.000 | 0.000 | 0.000 |
| 28 | 67.10 | 9.61  | 9.41  | 4.84 | 4.99 | 0.02 | 0.00 | 0.00 | 0.048 | 3.554 | 0.000 | 0.384 | 0.000 | 0.000 | 0.000 |
| 29 | 66.45 | 9.62  | 9.42  | 6.73 | 3.84 | 0.04 | 0.00 | 0.02 | 0.048 | 3.462 | 0.000 | 0.385 | 0.000 | 0.000 | 0.000 |
| 30 | 61.37 | 11.19 | 10.96 | 5.64 | 5.81 | 0.02 | 0.00 | 0.02 | 0.056 | 4.475 | 0.000 | 0.448 | 0.000 | 0.000 | 0.000 |
| 31 | 63.29 | 10.57 | 10.36 | 4.29 | 6.43 | 0.39 | 0.00 | 0.22 | 0.053 | 3.965 | 0.000 | 0.423 | 0.000 | 0.000 | 0.000 |
| 32 | 62.63 | 10.46 | 11.30 | 4.25 | 6.52 | 0.31 | 0.00 | 0.13 | 0.052 | 3.924 | 0.000 | 0.419 | 0.000 | 0.000 | 0.000 |
| 33 | 63.12 | 10.55 | 11.39 | 5.31 | 6.01 | 0.02 | 0.00 | 0.02 | 0.000 | 3.480 | 0.000 | 0.105 | 0.000 | 0.000 | 0.000 |
| 34 | 55.64 | 11.42 | 15.34 | 5.71 | 7.98 | 0.02 | 0.00 | 0.02 | 0.100 | 3.609 | 0.000 | 0.150 | 0.000 | 0.000 | 0.000 |
| 35 | 58.27 | 9.74  | 10.52 | 4.91 | 5.54 | 0.02 | 0.00 | 0.02 | 0.097 | 3.398 | 0.000 | 0.103 | 0.000 | 0.000 | 0.000 |
| 36 | 56.48 | 11.06 | 12.91 | 5.53 | 6.76 | 0.02 | 0.00 | 0.19 | 0.097 | 3.884 | 0.000 | 0.146 | 0.000 | 0.000 | 0.000 |
| 37 | 54.01 | 10.58 | 12.35 | 5.29 | 6.46 | 0.02 | 0.00 | 0.19 | 0.093 | 3.714 | 0.000 | 0.139 | 0.000 | 0.000 | 0.000 |
| 38 | 56.80 | 11.12 | 12.99 | 5.57 | 6.76 | 0.00 | 0.00 | 0.20 | 0.146 | 3.369 | 0.000 | 0.126 | 0.000 | 0.000 | 0.000 |
| 39 | 66.86 | 9.57  | 9.38  | 4.82 | 4.97 | 0.02 | 0.00 | 0.02 | 0.048 | 2.871 | 0.957 | 0.479 | 0.000 | 0.000 | 0.000 |
| 40 | 66.86 | 9.57  | 9.38  | 4.82 | 4.97 | 0.02 | 0.00 | 0.02 | 0.048 | 2.871 | 0.957 | 0.383 | 0.000 | 0.000 | 0.000 |
| 41 | 66.86 | 9.57  | 9.38  | 4.82 | 4.97 | 0.02 | 0.00 | 0.02 | 0.048 | 1.914 | 1.914 | 0.479 | 0.000 | 0.000 | 0.000 |
| 42 | 66.86 | 9.57  | 9.38  | 4.82 | 4.97 | 0.02 | 0.00 | 0.02 | 0.048 | 1.914 | 1.914 | 0.383 | 0.000 | 0.000 | 0.000 |
| 43 | 63.06 | 10.54 | 11.38 | 5.31 | 5.99 | 0.02 | 0.00 | 0.02 | 0.105 | 1.738 | 1.738 | 0.105 | 0.000 | 0.000 | 0.000 |
| 44 | 54.41 | 10.75 | 12.55 | 5.38 | 6.57 | 0.02 | 0.00 | 0.19 | 0.094 | 2.831 | 1.415 | 0.142 | 0.000 | 0.000 | 0.000 |
| 45 | 63.15 | 10.55 | 11.39 | 5.32 | 6.01 | 0.02 | 0.00 | 0.02 | 0.053 | 3.482 | 0.000 | 0.000 | 0.003 | 0.000 | 0.000 |
| 46 | 63.15 | 10.55 | 11.39 | 5.32 | 6.01 | 0.02 | 0.00 | 0.02 | 0.053 | 3.482 | 0.000 | 0.000 | 0.006 | 0.000 | 0.000 |
| 47 | 63.14 | 10.55 | 11.39 | 5.32 | 6.01 | 0.02 | 0.00 | 0.02 | 0.053 | 3.481 | 0.000 | 0.000 | 0.013 | 0.000 | 0.000 |
| 48 | 63.09 | 10.54 | 11.38 | 5.31 | 6.00 | 0.02 | 0.00 | 0.02 | 0.053 | 3.479 | 0.000 | 0.087 | 0.003 | 0.000 | 0.000 |
| 49 | 63.09 | 10.54 | 11.38 | 5.31 | 6.00 | 0.02 | 0.00 | 0.02 | 0.053 | 3.479 | 0.000 | 0.087 | 0.006 | 0.000 | 0.000 |
| 50 | 63.09 | 10.54 | 11.38 | 5.31 | 6.00 | 0.02 | 0.00 | 0.02 | 0.053 | 3.478 | 0.000 | 0.088 | 0.013 | 0.000 | 0.000 |
| 51 | 63.86 | 10.67 | 10.46 | 5.64 | 5.54 | 0.02 | 0.00 | 0.02 | 0.053 | 3.628 | 0.000 | 0.099 | 0.003 | 0.000 | 0.000 |
| 52 | 63.86 | 10.67 | 10.46 | 5.64 | 5.54 | 0.02 | 0.00 | 0.02 | 0.053 | 3.628 | 0.000 | 0.099 | 0.006 | 0.000 | 0.000 |
| 53 | 63.85 | 10.67 | 10.46 | 5.64 | 5.54 | 0.02 | 0.00 | 0.02 | 0.053 | 3.627 | 0.000 | 0.099 | 0.013 | 0.000 | 0.000 |
| 54 | 63.05 | 10.53 | 11.38 | 5.31 | 6.00 | 0.02 | 0.00 | 0.02 | 0.105 | 3.476 | 0.000 | 0.105 | 0.003 | 0.000 | 0.000 |
| 55 | 62.92 | 10.51 | 11.35 | 5.30 | 5.99 | 0.02 | 0.00 | 0.02 | 0.210 | 3.574 | 0.000 | 0.105 | 0.003 | 0.000 | 0.000 |
| 56 | 63.86 | 10.67 | 10.46 | 5.64 | 5.54 | 0.02 | 0.00 | 0.02 | 0.053 | 3.628 | 0.000 | 0.099 | 0.002 | 0.000 | 0.000 |
| 57 | 63.86 | 10.67 | 10.46 | 5.64 | 5.54 | 0.02 | 0.00 | 0.02 | 0.053 | 3.628 | 0.000 | 0.099 | 0.001 | 0.000 | 0.000 |
| 58 | 63.52 | 10.61 | 10.40 | 5.61 | 5.51 | 0.02 | 0.00 | 0.02 | 0.053 | 4.245 | 0.000 | 0.000 | 0.003 | 0.000 | 0.000 |
| 59 | 63.43 | 10.60 | 10.38 | 5.60 | 5.51 | 0.02 | 0.00 | 0.02 | 0.053 | 4.239 | 0.000 | 0.000 | 0.003 | 0.000 | 0.000 |
| 60 | 63.33 | 10.58 | 10.37 | 5.60 | 5.50 | 0.02 | 0.00 | 0.02 | 0.053 | 4.233 | 0.000 | 0.000 | 0.003 | 0.000 | 0.000 |
| 61 | 63.30 | 10.58 | 10.36 | 5.59 | 5.50 | 0.02 | 0.00 | 0.02 | 0.106 | 4.231 | 0.000 | 0.000 | 0.003 | 0.000 | 0.000 |
| 62 | 61.56 | 10.28 | 10.08 | 5.44 | 5.35 | 0.02 | 0.00 | 0.02 | 0.051 | 4.114 | 0.000 | 0.000 | 0.003 | 0.000 | 0.000 |
| 63 | 61.49 | 10.27 | 10.07 | 5.43 | 5.34 | 0.02 | 0.00 | 0.02 | 0.051 | 4.109 | 0.000 | 0.113 | 0.003 | 0.000 | 0.000 |
| 64 | 63.51 | 10.61 | 10.40 | 5.61 | 5.52 | 0.02 | 0.00 | 0.02 | 0.053 | 3.184 | 1.061 | 0.000 | 0.003 | 0.000 | 0.000 |
| 65 | 61.56 | 10.28 | 10.08 | 5.44 | 5.35 | 0.02 | 0.00 | 0.02 | 0.051 | 3.085 | 1.028 | 0.000 | 0.003 | 0.000 | 0.000 |
| 66 | 61.49 | 10.27 | 10.07 | 5.43 | 5.34 | 0.02 | 0.00 | 0.02 | 0.051 | 3.082 | 1.027 | 0.113 | 0.003 | 0.000 | 0.000 |

What is claimed is:

1. An article, comprising:
   $SiO_2$ from 40 mol % to 80 mol %;
   $Al_2O_3$ from 1 mol % to 20 mol %;
   $B_2O_3$ from 3 mol % to 50 mol %;
   $WO_3$ plus $MoO_3$ from 1 mol % to 18 mol %;
   at least one of: (i) Au from 0.001 mol % to 0.5 mol %, (ii) Ag from 0.025 mol % to 1.5 mol %, and (iii) Cu from 0.03 mol % to 1 mol %; and
   $R_2O$ from 0 mol % to 15 mol %, wherein the $R_2O$ is one or more of $Li_2O$, $Na_2O$, $K_2O$, $Rb_2O$ and $Cs_2O$,
   wherein $R_2O$ minus $Al_2O_3$ ranges from −12 mol % to 3.8 mol %.

2. The article of claim 1, wherein the Ag is from 0.1 mol % to 1 mol %.

3. The article of claim 1, wherein the Au is from 0.001 mol % to 0.5 mol %.

4. The article of claim 1, wherein the Cu is from 0.03 mol % to 1 mol %.

5. The article of claim 1, wherein the article comprises $WO_3$ from 0 mol % to 15 mol %.

6. The article of claim 1, wherein the article comprises $MoO_3$ from 0 mol % to 15 mol %.

7. The article of claim 1, wherein the $Al_2O_3$ is from 7 mol % to 15 mol %.

8. The article of claim 1, further comprising:
   RO from 0.01 mol % to 2 mol %, wherein the RO is one or more of MgO, CaO, SrO and BaO.

9. The article of claim 1, wherein the $R_2O$ minus $Al_2O_3$ ranges from −8 mol % to 3.8 mol %.

10. An article, comprising:
    $SiO_2$ from 60 mol % to 72 mol %;
    $Al_2O_3$ from 7 mol % to 12 mol %;
    $B_2O_3$ from 8 mol % to 15 mol %;
    $WO_3$ plus $MoO_3$ from 3 mol % to 6 mol %;
    RO from 0 mol % to 0.5 mol %, wherein the RO is one or more of MgO, CaO, SrO, BaO;
    at least one of: (i) Au from 0.001 mol % to 0.5 mol %, (ii) Ag from 0.025 mol % to 1.5 mol %, and (iii) Cu from 0.03 mol % to 1 mol %; and
    $R_2O$ from 7 mol % to 12 mol %, wherein $R_2O$ is one or more of $Li_2O$, $Na_2O$, $K_2O$, $Rb_2O$ and $Cs_2O$,
    wherein $R_2O$ minus $Al_2O_3$ ranges from −5 mol % to 1.5 mol %.

11. The article of claim 10, further comprising:
    at least one dopant selected from the group consisting of Ti, V, Cr, Mn, Fe, Co, Ni, Se, Nb, Tc, Ru, Rh, Pd, Cd, Te, Ta, Re, Os, Ir, Pt, Tl, Pb, Bi, Ce, Pr, Nd, Sm, Eu, Gd, Tb, Dy, Ho, Er, Tm, Yb, and Lu.

12. The article of claim 10, further comprising:
    $V_2O_5$ from 0.0001 mol % to 0.5 mol %.

13. The article of claim 10, wherein the $WO_3$ is from 0 mol % to 4 mol %.

14. The article of claim 10, wherein the $MoO_3$ is from 0 mol % to 4 mol %.

15. The article of claim 10, wherein the article comprises a plurality of crystalline precipitates comprising at least one of $WO_3$ and $MoO_3$.

16. The article of claim 10, further comprising:
    a compressive stress region.

17. An article, comprising:
    $SiO_2$ from 40 mol % to 80 mol %;
    $Al_2O_3$ from 1 mol % to 20 mol %;
    $B_2O_3$ from 3 mol % to 50 mol %;
    $WO_3$ plus $MoO_3$ from 1 mol % to 18 mol %;
    at least one of: (i) Au from 0.001 mol % to 0.5 mol %, (ii) Ag from 0.025 mol % to 1.5 mol %, and (iii) Cu from 0.03 mol % to 1 mol %; and
    a plurality of crystalline precipitates comprising: (i) at least one of Au, Ag and Cu; and (ii) at least one of W and Mo.

18. The article of claim 17, further comprising:
    a plurality of metallic Ag particles proximate a surface of the article.

19. The article of claim 17, wherein the article exhibits a set of transmitted color coordinates having: an L* value of from 14 to 90, an a* value from −18.6 to 49 and a b* value from −7.8 to 53.5 at a thickness of 0.5 mm under D65-10 illumination.

20. The article of claim 17, wherein the article exhibits an average transmittance of from 0.01% to 49% over a wavelength band of from 280 nm to 380 nm at a 0.5 mm thickness.

21. The article of claim 17, wherein the article exhibits an average transmittance of from 0.8% to 86% over a wavelength band of from 400 nm to 700 nm at a 0.5 mm thickness.

22. The article of claim 21, wherein the article exhibits a scattering of 25% or less over a wavelength band of 400 nm to 700 nm at a thickness of 1 mm.

23. The article of claim 17, wherein the article exhibits an average transmittance of from 0.13% to 88.7% over a wavelength band of from 700 nm to 2000 nm at a 0.5 mm thickness.

* * * * *

UNITED STATES PATENT AND TRADEMARK OFFICE
CERTIFICATE OF CORRECTION

PATENT NO. : 11,053,159 B2
APPLICATION NO. : 16/190712
DATED : July 6, 2021
INVENTOR(S) : Matthew John Dejneka et al.

It is certified that error appears in the above-identified patent and that said Letters Patent is hereby corrected as shown below:

On the Title Page

In Column 2, item (56), Other Publications, Line 37, delete "Quarternary" and insert -- Quaternary --, therefor.

On page 2, in Column 1, item (56), Other Publications, Line 13, delete "Perfomance" and insert -- Performance --, therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*